(12) United States Patent
Kim et al.

(10) Patent No.: US 11,570,781 B2
(45) Date of Patent: Jan. 31, 2023

(54) METHOD AND APPARATUS FOR RECEIVING DOWNLINK SIGNAL IN WIRELESS COMMUNICATION SYSTEM

(71) Applicant: LG Electronics Inc., Seoul (KR)

(72) Inventors: Hyungtae Kim, Seoul (KR); Jiwon Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 117 days.

(21) Appl. No.: 17/200,344

(22) Filed: Mar. 12, 2021

(65) Prior Publication Data

US 2021/0352649 A1   Nov. 11, 2021

(30) Foreign Application Priority Data

Mar. 13, 2020   (KR) .......................... 10-2020-0031551

(51) Int. Cl.
*H04W 72/04*   (2009.01)
*H04L 5/00*   (2006.01)

(52) U.S. Cl.
CPC ......... *H04W 72/048* (2013.01); *H04L 5/0048* (2013.01); *H04L 5/0053* (2013.01); *H04W 72/042* (2013.01)

(58) Field of Classification Search
CPC ............. H04W 72/048; H04W 72/042; H04L 5/0048; H04L 5/0053
See application file for complete search history.

(56) References Cited

U.S. PATENT DOCUMENTS

2020/0351892 A1\*   11/2020   Yi ...................... H04W 72/042

\* cited by examiner

*Primary Examiner* — Ronald B Abelson
(74) *Attorney, Agent, or Firm* — Fish & Richardson P.C.

(57) ABSTRACT

A method and an apparatus of transmitting and receiving a downlink signal in a wireless communication system is disclosed. A method of receiving a downlink signal by a terminal in a wireless communication system according to an embodiment of the present disclosure includes: transmitting capability information of the terminal to a base station, wherein the capability information includes information related to a number of second type quasi-colocation reference signal (QCL RS) supported by the terminal based on a number of activated receiving means of the terminal, receiving, from the base station, configuration information for a plurality of first type QCL RSs and at least one second type QCL RS and receiving the downlink signal based on the configuration information, and based on the number of second type QCL RS being 1, the downlink signal may be received based on one specific second type QCL RS among the at least one second type QCL RS.

19 Claims, 19 Drawing Sheets

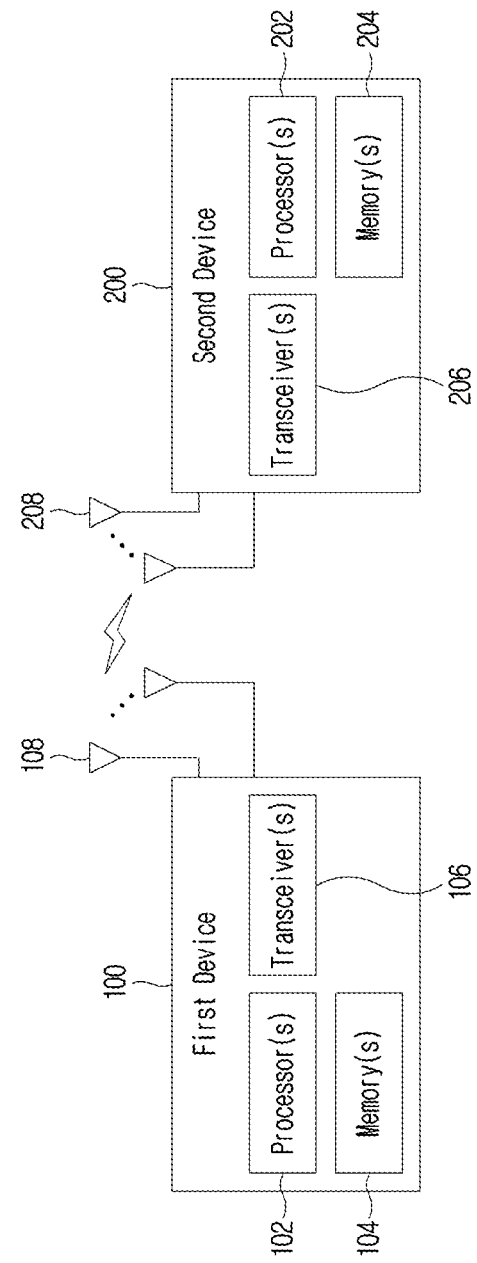

ical features of the present disclosure with detailed description.
METHOD AND APPARATUS FOR RECEIVING DOWNLINK SIGNAL IN WIRELESS COMMUNICATION SYSTEM

CROSS-REFERENCE TO RELATED APPLICATIONS

This application claims the benefit of earlier filing date and right of priority to Korean Application No. 10-2020-0031551, filed on Mar. 13, 2020, the contents of which are all hereby incorporated by reference herein in their entirety.

TECHNICAL FIELD

The present disclosure relates to a wireless communication system, and in more detail, relates to a method and an apparatus of transmitting and receiving a downlink signal in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical object of the present disclosure is to provide a method and an apparatus of transmitting and receiving a downlink signal.

An additional technical object of the present disclosure is to provide a method and an apparatus of configuring a reference signal (RS) in a quasi-colocation (QCL) relationship for transmission and reception of a downlink signal related to multiple TRPs (Transmission Reception Point).

An additional technical object of the present disclosure is to provide a method and an apparatus of configuring one or a plurality of QCL RSs according to a QCL type for transmission and reception of a downlink signal.

The technical objects to be achieved by the present disclosure are not limited to the above-described technical objects, and other technical objects which are not described herein will be clearly understood by those skilled in the pertinent art from the following description.

A method of receiving a downlink signal by a terminal in a wireless communication system according to an aspect of the present disclosure may include transmitting, to a base station, capability information of the terminal, wherein the capability information includes information related to a number of second type quasi-colocation reference signal (QCL RS) supported by the terminal based on a number of activated receiving means of the terminal, receiving, from the base station, configuration information for a plurality of first type QCL RSs and at least one second type QCL RS and receiving the downlink signal based on the configuration information, and based on the number of second type QCL RS being 1, the downlink signal may be received based on one specific second type QCL RS among the at least one second type QCL RS.

A method of transmitting a downlink signal by a base station in a wireless communication system according to an additional aspect of the present disclosure may include receiving, from a terminal, capability information of the terminal, wherein the capability information includes information related to a number of second type quasi-colocation reference signal (QCL RS) supported by the terminal based on a number of activated receiving means of the terminal, transmitting, to the terminal, configuration information for a plurality of first type QCL RSs and at least one second type QCL RS and transmitting the downlink signal based on the configuration information, and based on the number of second type QCL RS being 1, the downlink signal may be transmitted based on one specific second type QCL RS among the at least one second type QCL RS.

According to the present disclosure, a method and an apparatus of transmitting and receiving a downlink signal may be provided.

According to the present disclosure, a method and an apparatus of configuring a reference signal (RS) in a quasi-colocation (QCL) relationship for transmission and reception of a downlink signal associated with multiple TRPs (Transmission Reception Point) may be provided.

According to the present disclosure, a method and an apparatus of configuring one or a plurality of QCL RSs according to a QCL type for transmission and reception of a downlink signal may be provided.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

FIG. 19 is a diagram which illustrates a block diagram of a wireless communication system according to an embodiment of the present disclosure.

DETAILED DESCRIPTION

Figure 1:
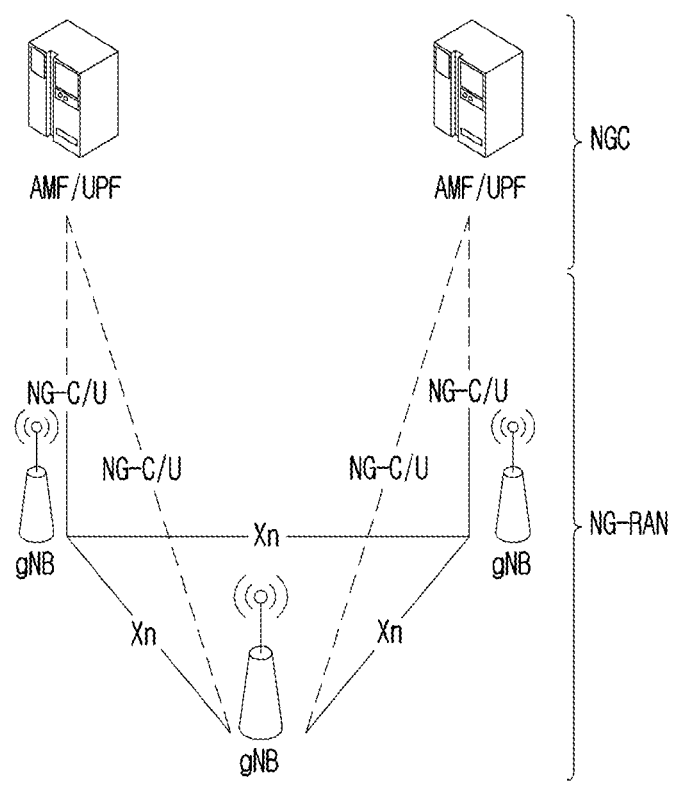
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.
BM: beam management
CQI: Channel Quality Indicator
CRI: channel state information—reference signal resource indicator
CSI: channel state information
CSI-IM: channel state information—interference measurement
CSI-RS: channel state information—reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC(Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
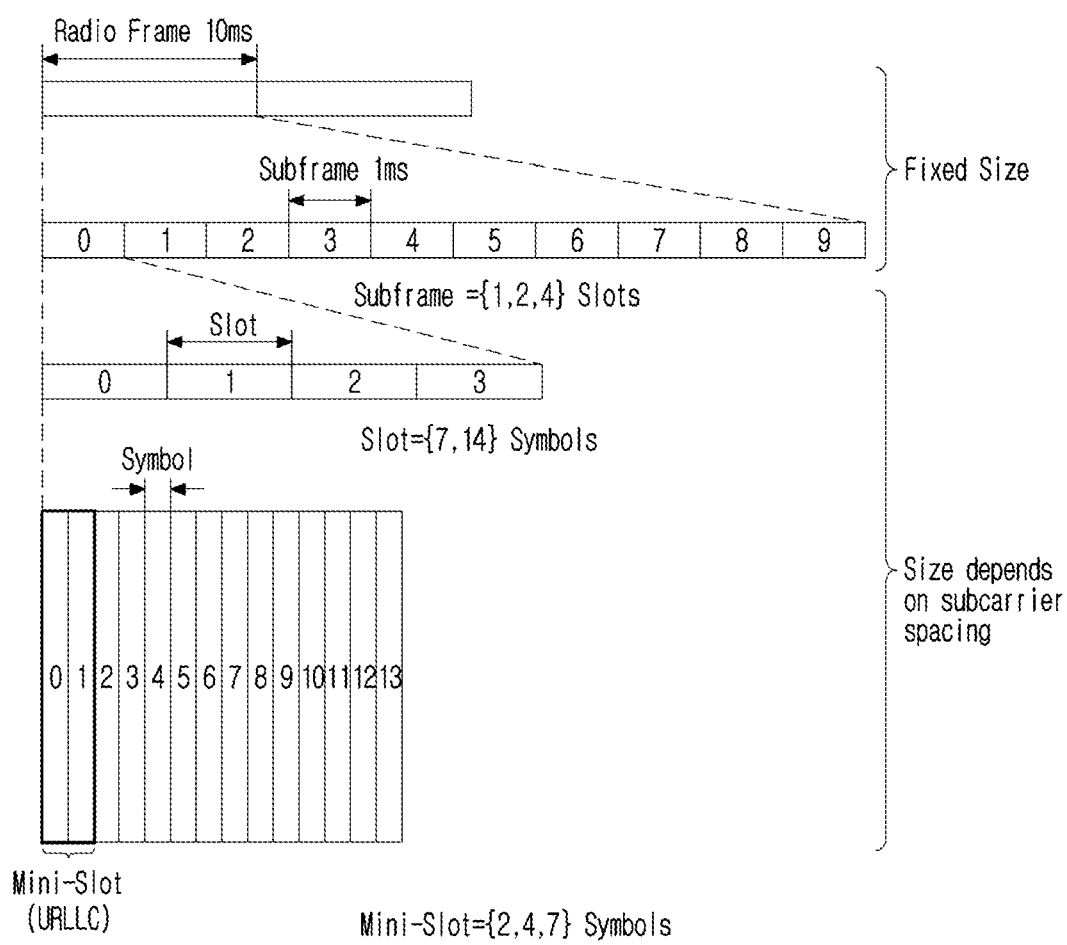
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, µ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| µ | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise.

An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is $480 \cdot 10^3$ Hz and $N_f$ is 4096. Downlink and uplink transmission is configured (organized) with a radio frame having a duration of $T_f=1/(\Delta f_{max} N_f/100) \cdot T_c=10$ ms. Here, a radio frame is configured with 10 subframes having a duration of $T_{sf}=(\Delta f_{max} N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration µ, slots are numbered in an increasing order of $n_s^\mu \in \{0, \ldots, N_{slot}^{subframe,\mu}-1\}$ in a subframe and are numbered in an increasing order of $n_{s,f}^\mu \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used.

Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| µ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| µ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on µ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols.

Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
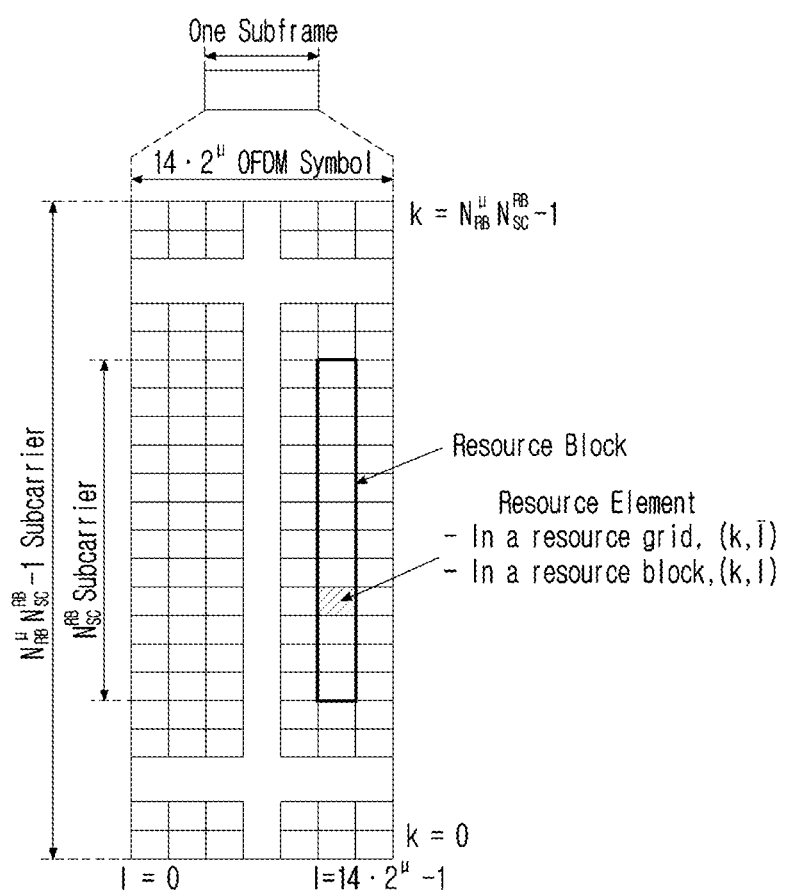
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^\mu N_{sc}^{RB}$ subcarriers in a frequency domain and one subframe is configured with $14 \cdot 2^\mu$ OFDM symbols, but it is not limited thereto. In an NR system, a transmitted signal is described by OFDM symbols of $2^\mu N_{symb}^{(\mu)}$ and one or more resource grids configured with $N_{RB}^\mu N_{sc}^{RB}$ subcarriers. Here, $N_{RB}^\mu \le N_{RB}^{max,\mu}$. The $N_{RB}^{max,\mu}$ represents a maximum transmission bandwidth, which may be different between an uplink and a downlink as well as between numerologies. In this case, one resource grid may be configured per µ and antenna port p. Each element of a resource grid for µ and an antenna port p is referred to as a resource element and is uniquely identified by an index pair (k,l'). Here, k=0, . . . , $N_{RB}^\mu N_{sc}^{RB}-1$ is an index in a frequency domain and l'=0, . . . , $2^\mu N_{symb}^{(\mu)}-1$ refers to a position of a symbol in a subframe. When referring to a resource element in a slot, an index pair (k,l) is used. Here, l=0, . . . , $N_{symb}^\mu-1$. A resource element (k,l') for μ and an antenna port p corresponds to a complex value, $a_{k,l'}^{(p,\mu)}$. When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^\mu$ and a resource element (k,l) for a subcarrier spacing configuration μ in a frequency domain is given as in the following Equation 1.

$$n_{CRB}^\mu = \left\lfloor \frac{k}{N_{sc}^{RB}} \right\rfloor \qquad \text{Equation 1}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^\mu = n_{PRB}^\mu + N_{BWP,i}^{start,\mu} \qquad \text{Equation 2}$$

$N_{BWP,i}^{start,\mu}$ is a common resource block that a BWP starts relatively to common resource block 0.

Figure 4:
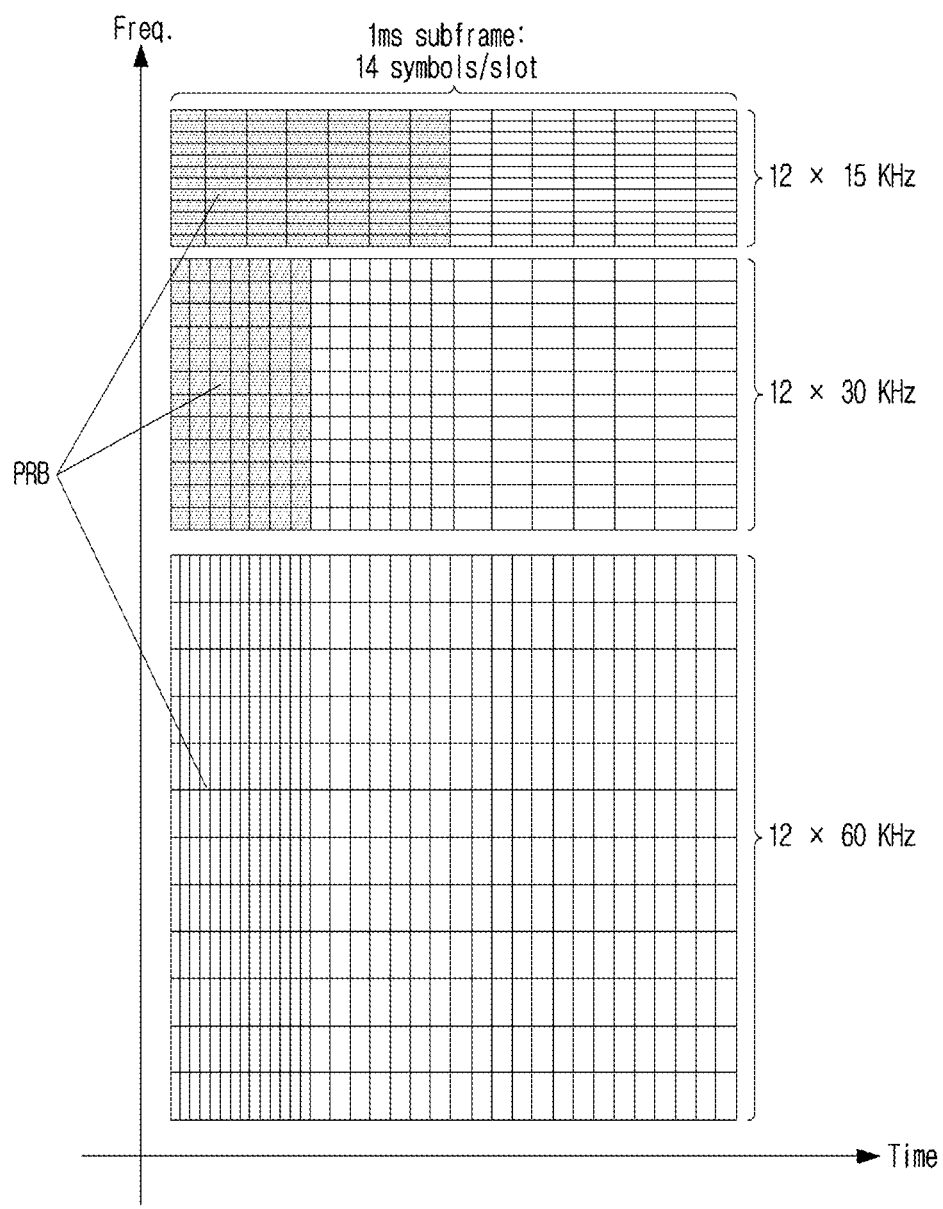
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
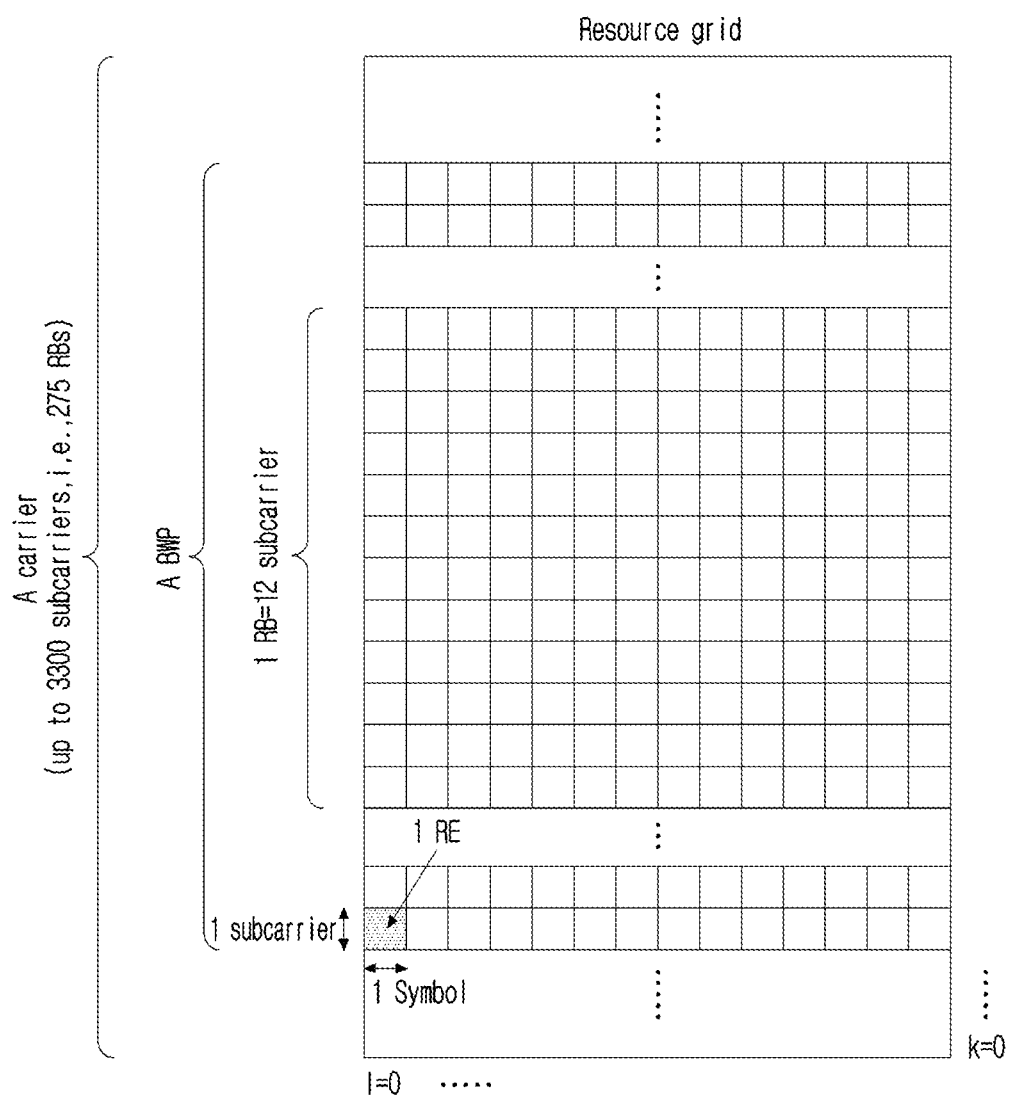
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
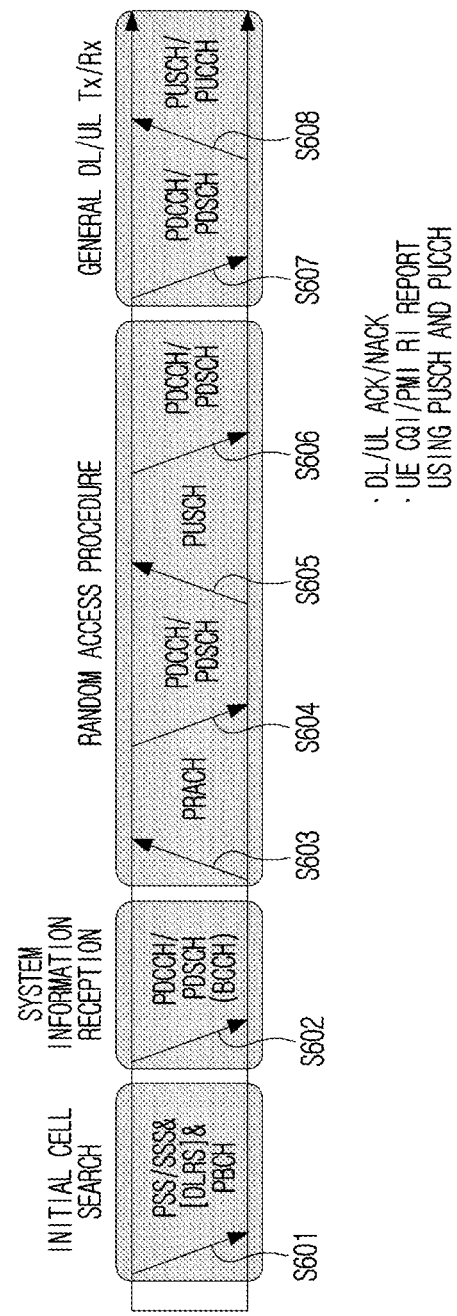
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH)

from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Beam Management (BM)

A BM procedure is L1 (layer 1)/L2 (layer 2) procedures to obtain and maintain a set of beams of a base station (e.g., a gNB, a TRP, etc.) and/or terminal (e.g., a UE) beams which may be used for downlink (DL) and uplink (UL) transmission/reception, it may include the following procedures and terms.

Beam measurement: An operation that a base station or a UE measures a property of a received beamformed signal Beam determination: An operation that a base station or a UE selects its Tx beam/Rx beam Beam sweeping: An operation that a spatial region is covered by using a Tx and/or Rx beam for a certain time interval in a pre-determined method Beam report: An operation that a UE reports information of a beamformed signal based on beam measurement A BM procedure may be classified into (1) a DL BM procedure using a SS (synchronization signal)/PBCH (physical broadcast channel) Block or a CSI-RS and (2) an UL BM procedure using an SRS (sounding reference signal).

In addition, each BM procedure may include Tx beam sweeping for determining a Tx Beam and Rx beam sweeping for determining a Rx beam.

Hereinafter, a DL BM procedure will be described.

A DL BM procedure may include (1) transmission of beamformed DL RSs (reference signals) of a base station (e.g., a CSI-RS or a SS Block (SSB)) and (2) beam reporting of a terminal.

Here, beam reporting may include preferred DL RS ID (identifier)(s) and corresponding L1-RSRP (Reference Signal Received Power).

The DL RS ID may be a SSBRI (SSB Resource Indicator) or a CRI (CSI-RS Resource Indicator).

Hereinafter, a DL BM procedure using an SSB will be described.

Figure 7:
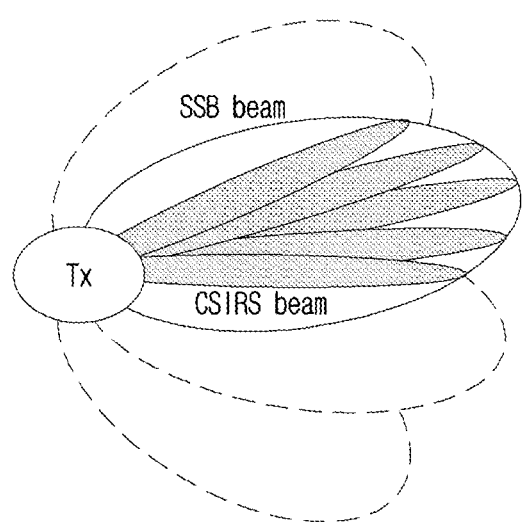
FIG. 7 is a diagram which illustrates a downlink beam management operation in a wireless communication system to which the present disclosure may be applied.

FIG. 7 is a diagram which illustrates a downlink beam management operation in a wireless communication system to which the present disclosure may be applied.

In reference to FIG. 7, an SSB beam and a CSI-RS beam may be used for beam measurement. A measurement metric is L1-RSRP per resource/block. An SSB may be used for coarse beam measurement and a CSI-RS may be used for fine beam measurement. An SSB may be used for both of Tx beam sweeping and Rx beam sweeping.

Rx beam sweeping using an SSB may be performed while an UE changes an Rx beam for the same SSBRI across a plurality of SSB bursts. In this case, one SS burst includes one or more SSBs and one SS burst set includes one or more SSB bursts.

Figure 8:
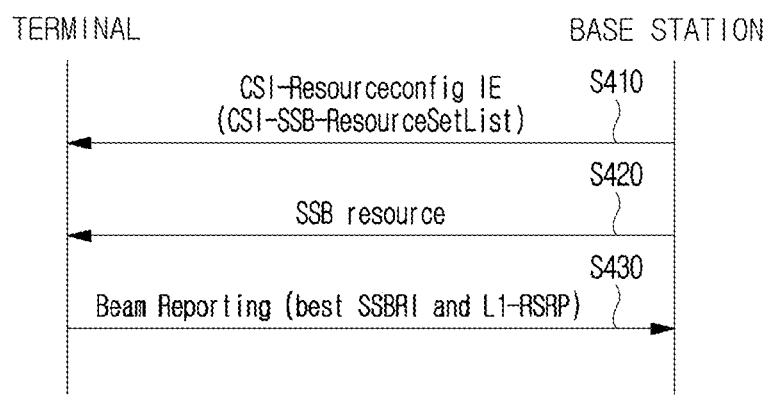
FIG. 8 is a diagram which illustrates a downlink beam management procedure using SSB in a wireless communication system to which the present disclosure may be applied.

FIG. 8 is a diagram which illustrates a downlink beam management procedure using SSB in a wireless communication system to which the present disclosure may be applied.

A configuration on a beam report using an SSB is performed in a CSI/beam configuration in a RRC connected state (or a RRC connected mode).

In reference to FIG. 8, a terminal receives CSI-ResourceConfig IE including CSI-SSB-ResourceSetList including SSB resources used for BM from a base station (S410).

Table 6 represents an example of CSI-ResourceConfig IE and as in Table 6, a BM configuration using an SSB configures an SSB like a CSI-RS resource without being separately defined.

A terminal receives an SSB resource from the base station based on the CSI-SSB-ResourceSetList (S420).

When CSI-RS reportConfig related to a report on a SSBRI and L1-RSRP is configured, the terminal performs (beam) reporting of the best SSBRI and corresponding L1-RSRP to a base station (S430).

Hereinafter, a DL BM procedure using a CSI-RS will be described.

Describing a usage of a CSI-RS, i) a repetition parameter is configured for a specific CSI-RS resource set and when TRS_info is not configured, a CSI-RS is used for beam management. ii) when a repetition parameter is not configured and TRS_info is configured, a CSI-RS is used for a TRS (tracking reference signal). iii) when a repetition parameter is not configured and TRS_info is not configured, a CSI-RS is used for CSI acquisition.

Such a repetition parameter may be configured only for CSI-RS resource sets associated with CSI-ReportConfig having a report of L1 RSRP or 'No Report (or None)'.

If a terminal is configured with CSI-ReportConfig in which reportQuantity is configured as 'cri-RSRP' or 'none' and CSI-ResourceConfig for channel measurement (a higher layer parameter resourcesForChannelMeasurement) does not include a higher layer parameter 'trs-Info' and includes NZP-CSI-RS-ResourceSet in which a higher layer parameter 'repetition' is configured, the terminal may be configured only with a same number of port (1-port or 2-port) having a higher layer parameter 'nrofPorts' for all CSI-RS resources in NZP-CSI-RS-ResourceSet.

When (a higher layer parameter) repetition is configured as 'ON', it is related to a Rx beam sweeping procedure of a terminal. In this case, when a terminal is configured with NZP-CSI-RS-ResourceSet, the terminal may assume that at least one CSI-RS resource in NZP-CSI-RS-ResourceSet is transmitted with the same downlink spatial domain transmission filter. In other words, at least one CSI-RS resource in NZP-CSI-RS-ResourceSet is transmitted through the same Tx beam. Here, at least one CSI-RS resource in NZP-CSI-RS-ResourceSet may be transmitted in a different

TABLE 6

```
ASN1START
TAG-CSI-RESOURCECONFIG-START
CSI-ResourceConfig ::=        SEQUENCE {
csi-ResourceConfigId          CSI-ResourceConfigId,
csi-RS-ResourceSetList        CHOICE {
nzp-CSI-RS-SSB                SEQUENCE {
nzp-CSI-RS-ResourceSetList    SEQUENCE (SIZE (1..maxNrofNZP-CSI-RS-
ResourceSetsPerConfig)) OF NZP-CSI-RS-ResourceSetId OPTIONAL,
csi-SSB-ResourceSetList       SEQUENCE (SIZE (1..maxNrofCSI-SSB-
ResourceSetsPerConfig)) OF CSI-SSB-ResourceSetId OPTIONAL
},
csi-IM-ResourceSetList        SEQUENCE (SIZE (1..maxNrofCSI-IM-
ResourceSetsPerConfig)) OF CSI-IM-ResourceSetId
},
bwp-Id                        BWP-Id,
resourceType                  ENUMERATED { aperiodic, semiPersistent,
periodic },
...
}
TAG-CSI-RESOURCECONFIGTOADDMOD-STOP
-- ASN1STOP
```

In Table 6, a csi-SSB-ResourceSetList parameter represents a list of SSB resources used for beam management and reporting in one resource set. Here, an SSB resource set may be configured as {SSBx1, SSBx2, SSBx3, SSBx4, . . . }. An SSB index may be defined from 0 to 63.

OFDM symbol. In addition, a terminal does not expect to receive a different periodicity in periodicityAndOffset in all CSI-RS resources in NZP-CSI-RS-Resourceset.

Meanwhile, when repetition is configured as 'OFF', it is related to a Tx beam sweeping procedure of a base station. In this case, when repetition is configured as 'OFF', a terminal does not assume that at least one CSI-RS resource in NZP-CSI-RS-ResourceSet is transmitted in the same downlink spatial domain transmission filter. In other words, at least one CSI-RS resource in NZP-CSI-RS-ResourceSet is transmitted through a different Tx beam.

In other words, when reportQuantity of the CSI-RS reportConfig IE is configured as 'ssb-Index-RSRP', a terminal reports the best SSBRI and corresponding L1-RSRP to a base station.

In addition, when a CSI-RS resource may be configured in the same OFDM symbol(s) as an SSB (SS/PBCH Block) and 'QCL-TypeD' is applicable, the terminal may assume that a CSI-RS and an SSB are quasi co-located with regard to 'QCL-TypeD'.

Here, the QCL TypeD may mean that antenna ports are quasi-colocated with regard to a spatial Rx parameter. When a terminal receives a plurality of DL antenna ports in a QCL Type D relationship, it is allowed to apply the same Rx beam. In addition, a terminal does not expect that a CSI-RS will be configured in a RE overlapped with a RE of an SSB.

Figure 9A:
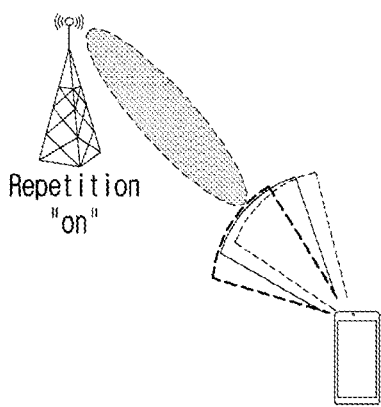
FIGS. 9A and 9B are diagrams which illustrates a downlink beam management operation using CSI-RS in a wireless communication system to which the present disclosure may be applied.
Figure 9B:
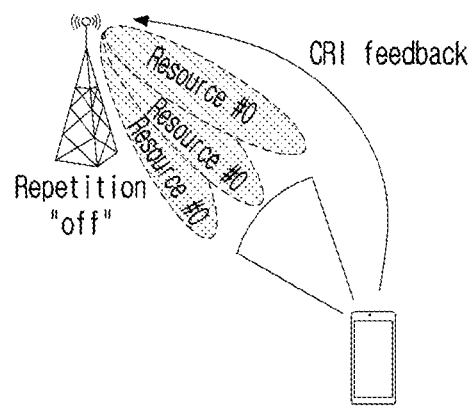

FIGS. 9A and 9B are diagrams which illustrates a downlink beam management operation using CSI-RS in a wireless communication system to which the present disclosure may be applied.

FIG. 9A represents a Rx beam determination (or refinement) procedure of a terminal and FIG. 9B represents a Tx beam sweeping procedure of a base station. In addition, FIG. 9A is a case when a repetition parameter is configured as 'ON' and FIG. 9B is a case when a repetition parameter is configured as 'OFF'.

Figure 10:
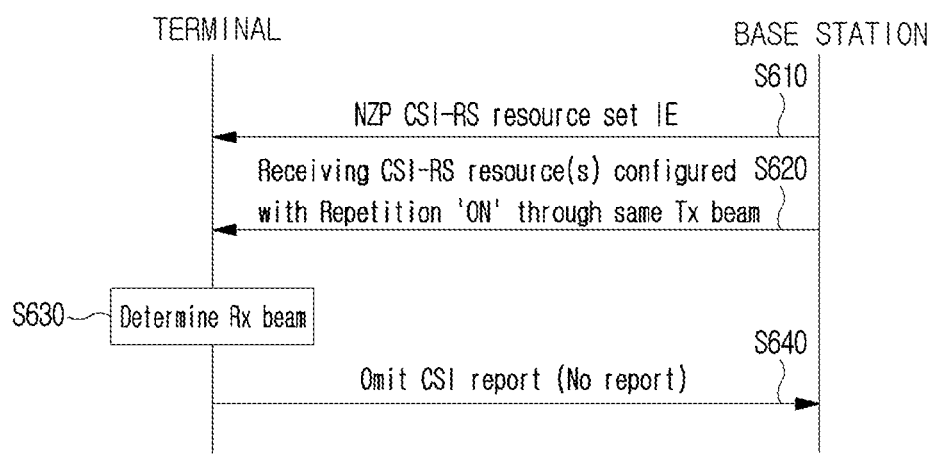
FIG. 10 is a diagram which illustrates an Rx beam determination process of a terminal in a wireless communication system to which the present disclosure may be applied.

FIG. 10 is a diagram which illustrates an Rx beam determination process of a terminal in a wireless communication system to which the present disclosure may be applied.

In reference to FIG. 9A and FIG. 10, an Rx beam determination process of a terminal is described.

A terminal receives NZP CSI-RS resource set IE including a higher layer parameter repetition through RRC signaling from a base station (S610). Here, the repetition parameter is configured as 'ON'.

A terminal repetitively receives resources in a CSI-RS resource set configured as repetition 'ON' through the same Tx beam (or DL spatial domain transmission filter) of a base station in a different OFDM symbol (S620).

A terminal determines its Rx beam (S630).

A terminal omits a CSI report (S640). In this case, reportQuantity of a CSI report configuration may be configured as 'No report (or None)'.

In other words, the terminal may omit a CSI report when it is configured as repetition 'ON'.

Figure 11:
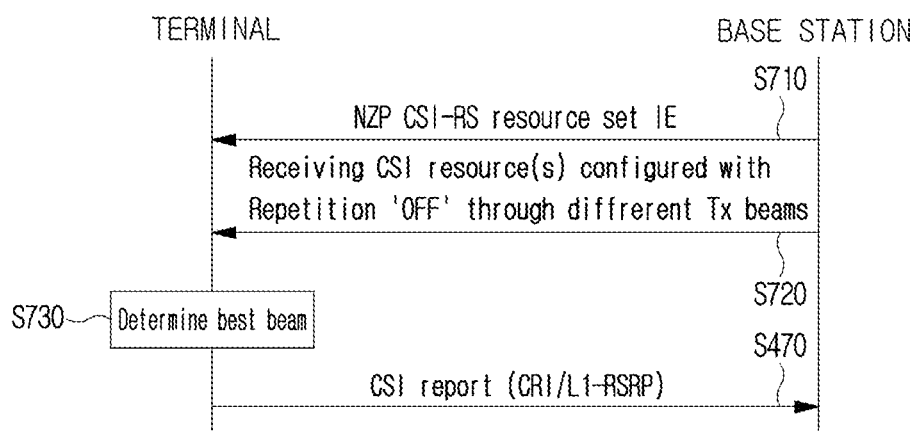
FIG. 11 is a diagram which illustrates a Tx beam determination process of a base station in a wireless communication system to which the present disclosure may be applied.

FIG. 11 is a diagram which illustrates a Tx beam determination process of a base station in a wireless communication system to which the present disclosure may be applied.

In reference to FIG. 9B and FIG. 11, a Tx beam determination process of a base station is described.

A terminal receives NZP CSI-RS resource set IE including a higher layer parameter repetition through RRC signaling from a base station (S710). Here, the repetition parameter is configured as 'OFF' and it is related to a Tx beam sweeping procedure of a base station.

A terminal receives resources in a CSI-RS resource set configured as repetition 'OFF' through a different Tx beam (or DL spatial domain transmission filter) of a base station (S720).

A terminal selects (or determines) the best beam (S740).

A terminal reports an ID and related quality information (e.g., L1-RSRP) of a selected beam to a base station (S740). In this case, reportQuantity of a CSI report configuration may be configured as 'CRI+L1-RSRP'.

In other words, when a CSI-RS is transmitted for BM, the terminal reports a CRI and a related L1-RSRP.

Figure 12:
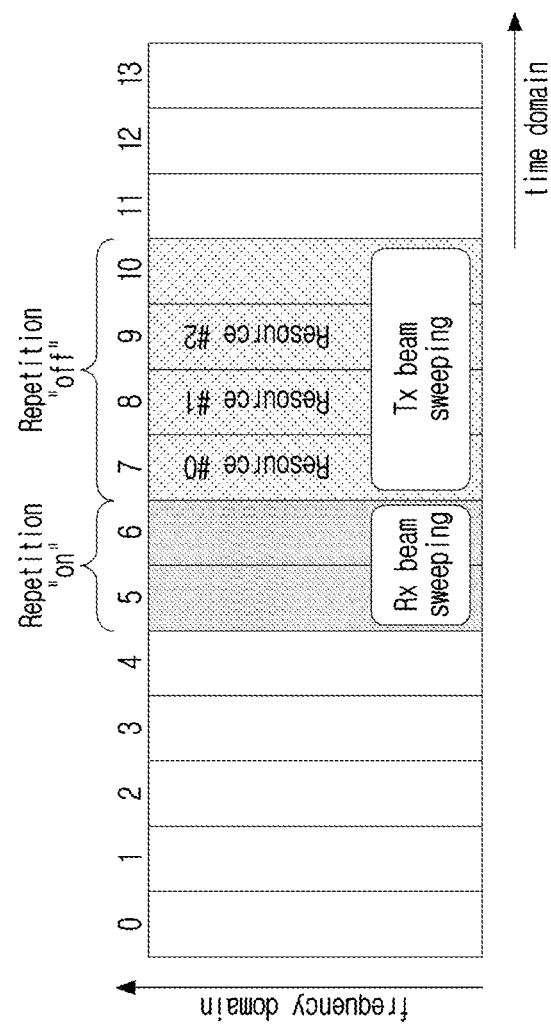
FIG. 12 is a diagram which illustrates resource allocation in a time and frequency domain related to a downlink beam management operation in a wireless communication system to which the present disclosure may be applied.

FIG. 12 is a diagram which illustrates resource allocation in a time and frequency domain related to a downlink beam management operation in a wireless communication system to which the present disclosure may be applied.

In reference to FIG. 12, it is shown that when repetition 'ON' is configured in a CSI-RS resource set, a plurality of CSI-RS resources are repetitively used by applying the same Tx beam and when repetition 'OFF' is configured in a CSI-RS resource set, different CSI-RS resources are transmitted in a different Tx beam.

Hereinafter, a beam indication method related to downlink BM will be described.

A terminal may be configured by RRC with a list of a maximum M candidate transmission configuration indication (TCI) states at least for a purpose of a QCL (Quasi Co-location) indication. Here, M may be 64.

Each TCI state may be configured as one RS set. Each ID of a DL RS at least for a spatial QCL purpose (QCL Type D) in a RS set may refer to one of DL RS types such as an SSB, a P (periodic)-CSI RS, an SP (semi-persistent)-CSI RS, an A (aperiodic)-CSI RS, etc.

An ID of DL RS(s) in a RS set used at least for a purpose of a spatial QCL may be initialized/updated at least by explicit signaling.

Table 7 illustrates a TCI-State information element (IE).

A TCI-State IE is associated with a quasi co-location (QCL) type corresponding to one or two DL reference signals (RS).

TABLE 7

```
ASN1START
TAG-TCI-STATE-START
TCI-State ::=       SEQUENCE {
tci-StateId             TCI-StateId,
qcl-Type1               QCL-Info,
qcl-Type2               QCL-
Info                             OPTIONAL, --
Need R
...
}
QCL-Info ::=        SEQUENCE{
cell                    ServCellIndex
    OPTIONAL,  -- Need R
bwp-Id                  BWP-
Id                               OPTIONAL, --
Cond CSI-RS-Indicated
referenceSignal         CHOICE {
csi-rs                  NZP-CSI-RS-ResourceId,
ssb                     SSB-Index
},
...
qcl-Type                ENUMERATED {typeA, typeB,
                        typeC, typeD},
...
}
TAG-TCI-STATE-STOP
- ASN1STOP
```

In Table 7, a bwp-Id parameter represents a DL BWP (bandwidth part) where an RS is located, a cell parameter represents a carrier where a RS is located and a reference signal parameter represents reference antenna port(s) which is a source of a quasi co-location for corresponding target antenna port(s) or a reference signal including it. The target antenna port(s) may be a CSI-RS, a PDCCH DMRS, or a PDSCH DMRS. In an example, a corresponding TCI state ID (identifier) may be indicated in NZP CSI-RS resource configuration information to indicate QCL reference RS information for a NZP (non-zero power) CSI-RS. In another example, a TCI state ID may be indicated to each CORESET configuration to indicate QCL reference information for PDCCH DMRS antenna port(s). In another example, a TCI state ID may be indicated through DCI to indicate QCL reference information for PDSCH DMRS antenna port(s).

Hereinafter, uplink beam management will be described.

For UL BM, beam reciprocity (or beam correspondence) between a Tx beam and a Rx beam may be valid or may not be valid according to terminal implementation. If reciprocity between a Tx beam and a Rx beam is valid both in a base station and a terminal, a UL beam pair may be matched by a DL beam pair. But, when reciprocity between a Tx beam and a Rx beam is not valid in any one of a base station and a terminal, a process for determining a UL beam pair is required separately from a DL beam pair determination.

In addition, although both of a base station and a terminal maintain beam correspondence, a base station may use a UL BM procedure for determining a DL Tx beam without requesting a terminal to report a preferred beam.

UL BM may be performed through beamformed UL SRS transmission and whether UL BM of an SRS resource set is applied may be configured by a (higher layer parameter) usage. When a usage is configured as 'BeamManagement (BM)', only one SRS resource may be transmitted in each of a plurality of SRS resource sets in a given time instant.

A terminal may be configured with one or more SRS (Sounding Reference Symbol) resource sets configured by (a higher layer parameter) SRS-ResourceSet (through higher layer signaling, RRC signaling, etc.) For each SRS resource set, a UE may be configured with K≥1 SRS resources (a higher layer parameter SRS-resource). Here, K is a natural number and the maximum number of K is indicated by SRS_capability.

Like DL BM, an UL BM procedure may be also classified into Tx beam sweeping of a terminal and Rx beam sweeping of a base station.

Figures 13A, 13B:
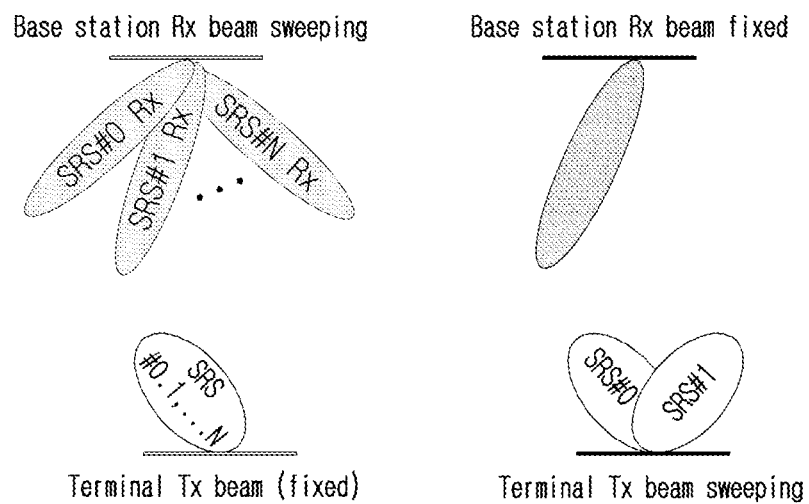
FIGS. 13A and 13B are diagrams which illustrates an uplink beam management operation using SRS in a wireless communication system to which the present disclosure may be applied.

FIGS. 13A and 13B are diagrams which illustrates an uplink beam management operation using SRS in a wireless communication system to which the present disclosure may be applied.

FIG. 13A illustrates a Rx beam determination operation of a base station and FIG. 13B illustrates a Tx beam sweeping operation of a terminal.

Figure 14:
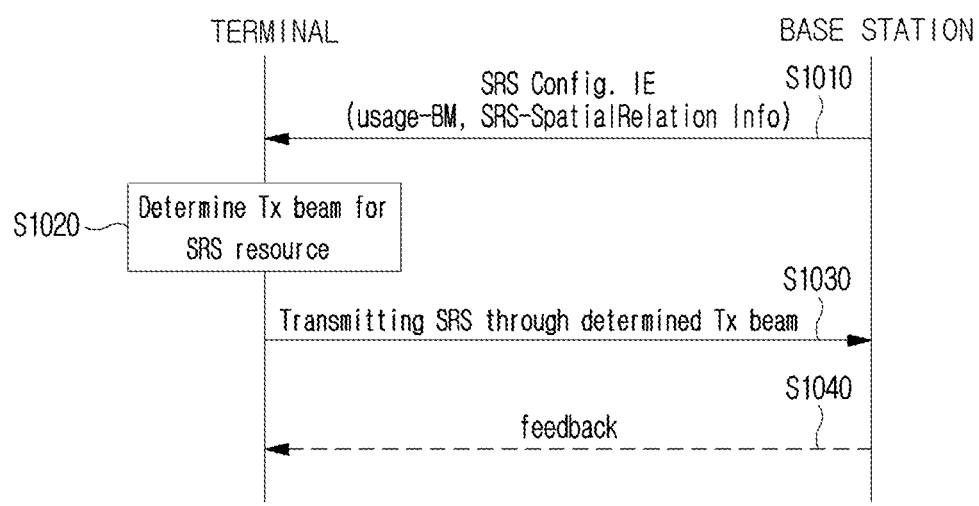
FIG. 14 is a diagram which illustrates an uplink beam management procedure in a wireless communication system to which the present disclosure may be applied.

FIG. 14 is a diagram which illustrates an uplink beam management procedure in a wireless communication system to which the present disclosure may be applied.

A terminal receives RRC signaling (e.g., an SRS-Config IE) including a (higher layer parameter) usage parameter configured as 'beam management' from a base station (S1010).

Table 8 represents an example of an SRS-Config IE (Information Element) and an SRS-Config IE is used for SRS transmission configuration. An SRS-Config IE includes a list of SRS-Resources and a list of SRS-ResourceSets. Each SRS resource set means a set of SRS-resources.

A network may trigger transmission of an SRS resource set by using configured aperiodicSRS-ResourceTrigger (L1 DCI).

TABLE 8

| | |
|---|---|
| ASN1START | |
| TAG-MAC-CELL-GROUP-CONFIG-START | |
| SRS-Config ::= | SEQUENCE { |
| srs-ResourceSetToReleaseList | SEQUENCE (SIZE(1..maxNrofSRS- |
| ResourceSets)) OF SRS-ResourceSetId | OPTIONAL, -- Need N |
| srs-ResourceSetToAddModList | SEQUENCE (SIZE(1..maxNrofSRS- |
| ResourceSets)) OF SRS-ResourceSet | OPTIONAL, -- Need N |
| srs-ResourceToReleaseList | SEQUENCE (SIZE(1..maxNrofSRS- |
| Resources)) OF SRS-ResourceId | OPTIONAL, -- Need N |
| srs-ResourceToAddModList | SEQUENCE (SIZE(1..maxNrofSRS- |
| Resources)) OF SRS-Resource | OPTIONAL, -- Need N |
| tpc-Accumulation | ENUMERATED |
| {disabled} | OPTIONAL, -- |
| Need S | |
| ... | |
| } | |
| SRS-ResourceSet ::= | SEQUENCE { |
| srs-ResourceSetId | SRS-ResourceSetId, |
| srs-ResourceIdList | SEQUENCE (SIZE(1..maxNrofSRS- |
| ResourcesPerSet)) OF SRS-ResourceId | OPTIONAL, -- Cond Setup |
| resourceType | CHOICE { |
| aperiodic | SEQUENCE { |
| aperiodicSRS-ResourceTrigger | INTEGER (1 ..maxNrofSRS-TriggerStates−1), |
| csi-RS | NZP-CSI-RS- |
| ResourceId | OPTIONAL, -- Cond |
| NonCodebook | |
| slotOffset | INTEGER |
| (1..32) | OPTIONAL, -- Need S |
| ... | |
| }, | |
| semi-persistent | SEQUENCE { |
| associatedCSI-RS | NZP-CSI-RS- |
| ResourceId | OPTIONAL, -- Cond |
| NonCodebook | |
| ... | |
| }, | |
| periodic | SEQUENCE { |
| associatedCSI-RS | NZP-CSI-RS- |
| ResourceId | OPTIONAL, -- Cond |

TABLE 8-continued

```
NonCodebook
...
}
}
},
usage                            ENUMERATED {beamManagement,
codebook, nonCodebook, antennaSwitching},
alpha                            Alpha
                                 OPTIONAL, -- Need S
p0                               INTEGER (-
202..24)                         OPTIONAL, -- Cond
Setup
pathlossReferenceRS              CHOICE {
ssb-Index                            SSB-Index,
csi-RS-Index                         NZP-CSI-RS-ResourceId
SRS-SpatialRelationInfo ::=      SEQUENCE {
servingCellId                        ServCellIndex
    OPTIONAL, -- Need S
referenceSignal                  CHOICE {
ssb-Index                            SSB-Index,
csi-RS-Index                         NZP-CSI-RS-ResourceId,
srs                                  SEQUENCE {
resourceId                               SRS-ResourceId,
uplinkBWP                                BWP-Id
}
}
}
SRS-ResourceId ::=               INTEGER
(0. .maxNrofSRS-Resources-1)
```

In Table 8, usage represents a higher layer parameter which indicates whether an SRS resource set is used for beam management or is used for codebook-based or non-codebook-based transmission. A usage parameter corresponds to a L1 parameter 'SRS-SetUse'. 'spatialRelationInfo' is a parameter which represents a configuration of a spatial relation between a reference RS and a target SRS. Here, a reference RS may be a SSB, a CSI-RS or a SRS corresponding to a L1 parameter 'SRS-SpatialRelationInfo'. The usage is configured per SRS resource set.

A terminal determines a Tx beam for an SRS resource which will be transmitted based on SRS-SpatialRelation Info included in the SRS-Config IE (S1020). Here, SRS-SpatialRelation Info is configured per SRS resource and represents whether the same beam as a beam used in a SSB, a CSI-RS or a SRS will be applied per SRS resource. In addition, SRS-SpatialRelationInfo may be configured or may not be configured for each SRS resource.

If SRS-SpatialRelationInfo is configured for an SRS resource, the same beam as a beam used in a SSB, a CSI-RS or a SRS is applied and transmitted. But, if SRS-SpatialRelationInfo is not configured for an SRS resource, the terminal randomly determines a Tx beam and transmits an SRS through the determined Tx beam (S1030).

In more detail, for a P-SRS that 'SRS-ResourceConfigType' is configured as 'periodic':
i) when SRS-SpatialRelationInfo is configured as 'SSB/PBCH', a UE transmits a corresponding SRS resource by applying the same spatial domain transmission filter (or generated by a corresponding filter) as a spatial domain Rx filter used for SSB/PBCH reception; or
ii) when SRS-SpatialRelationInfo is configured as 'CSI-RS', a UE transmits a SRS resource by applying the same spatial domain transmission filter used for periodic CSI-RS or SP (semi-persistent) CSI-RS reception; or
iii) when SRS-SpatialRelationInfo is configured as 'SRS', a UE transmits a corresponding SRS resource by applying the same spatial domain transmission filter used for periodic SRS transmission.

Although 'SRS-ResourceConfigType' is configured as 'SP (semi-persistent)-SRS' or 'AP (aperiodic)-SRS', a beam determination and transmission operation may be applied in a way similar to the above.

Additionally, a terminal may receive or may not receive a feedback on an SRS from a base station as in the following three cases (S1040).
i) when Spatial_Relation_Info is configured for all SRS resources in a SRS resource set, a terminal transmits an SRS with a beam indicated by a base station. For example, when Spatial_Relation_Info indicates all the same SSB, CRI or SRI, a terminal repetitively transmits an SRS with the same beam. This case corresponds to FIG. 13A as a usage for a base station to select an Rx beam.
ii) Spatial_Relation_Info may not be configured for all SRS resources in an SRS resource set. In this case, a terminal may transmit with freely changing SRS beams. In other words, this case corresponds to FIG. 13B as a usage for a terminal to sweep Tx beams.
iii) Spatial_Relation_Info may be configured only for a part of SRS resources in an SRS resource set. In this case, for a configured SRS resource, an SRS may be transmitted with an indicated beam, and for a SRS resource that Spatial_Relation_Info is not configured an SRS may be transmitted by randomly applying a Tx beam by a terminal.

CSI-Related Operation

In an NR (New Radio) system, a CSI-RS (channel state information-reference signal) is used for time and/or frequency tracking, CSI computation, L1 (layer 1)-RSRP (reference signal received power) computation and mobility. Here, CSI computation is related to CSI acquisition and L1-RSRP computation is related to beam management (BM).

CSI (channel state information) collectively refers to information which may represent quality of a radio channel (or also referred to as a link) formed between a terminal and an antenna port.

To perform one of the usages of a CSI-RS, a terminal (e.g., user equipment, UE) receives configuration information related to CSI from a base station (e.g., general Node B, gNB) through RRC (radio resource control) signaling.

The configuration information related to CSI may include at least one of information related to a CSI-IM (interference management) resource, information related to CSI measurement configuration, information related to CSI resource configuration, information related to a CSI-RS resource or information related to CSI report configuration.

i) Information related to a CSI-IM resource may include CSI-IM resource information, CSI-IM resource set information, etc. A CSI-IM resource set is identified by a CSI-IM resource set ID (identifier) and one resource set includes at least one CSI-IM resource. Each CSI-IM resource is identified by a CSI-IM resource ID.

ii) Information related to CSI resource configuration may be expressed as CSI-ResourceConfig IE. Information related to a CSI resource configuration defines a group which includes at least one of an NZP (non zero power) CSI-RS resource set, a CSI-IM resource set or a CSI-SSB resource set. In other words, the information related to a CSI resource configuration may include a CSI-RS resource set list and the CSI-RS resource set list may include at least one of a NZP CSI-RS resource set list, a CSI-IM resource set list or a CSI-SSB resource set list. A CSI-RS resource set is identified by a CSI-RS resource set ID and one resource set includes at least one CSI-RS resource. Each CSI-RS resource is identified by a CSI-RS resource ID.

Parameters representing a usage of a CSI-RS (e.g., a 'repetition' parameter related to BM, a 'trs-Info' parameter related to tracking) may be configured per NZP CSI-RS resource set.

iii) Information related to a CSI report configuration includes a report configuration type (reportConfigType) parameter representing a time domain behavior and a report quantity (reportQuantity) parameter representing CSI-related quantity for a report. The time domain behavior may be periodic, aperiodic or semi-persistent.

A terminal measures CSI based on the configuration information related to CSI.

The CSI measurement may include (1) a process in which a terminal receives a CSI-RS and (2) a process in which CSI is computed through a received CSI-RS and detailed description thereon is described after.

For a CSI-RS, RE (resource element) mapping of a CSI-RS resource in a time and frequency domain is configured by higher layer parameter CSI-RS-ResourceMapping.

A terminal reports the measured CSI to a base station.

In this case, when quantity of CSI-ReportConfig is configured as 'none (or No report)', the terminal may omit the report. But, although the quantity is configured as 'none (or No report)', the terminal may perform a report to a base station. When the quantity is configured as 'none', an aperiodic TRS is triggered or repetition is configured. In this case, only when repetition is configured as 'ON', a report of the terminal may be omitted.

CSI Measurement

An NR system supports more flexible and dynamic CSI measurement and reporting. Here, the CSI measurement may include a procedure of receiving a CSI-RS and acquiring CSI by computing a received CSI-RS.

As a time domain behavior of CSI measurement and reporting, aperiodic/semi-persistent/periodic CM (channel measurement) and IM (interference measurement) are supported. 4-port NZP CSI-RS RE pattern is used for CSI-IM configuration.

CSI-IM based IMR of NR has a design similar to CSI-IM of LTE and is configured independently from ZP CSI-RS resources for PDSCH rate matching. In addition, each port emulates an interference layer having (a desirable channel and) a precoded NZP CSI-RS in NZP CSI-RS-based IMR. As it is about intra-cell interference measurement for a multi-user case, MU interference is mainly targeted.

A base station transmits a precoded NZP CSI-RS to a terminal in each port of configured NZP CSI-RS based IMR.

A terminal assumes a channel/interference layer and measures interference for each port in a resource set.

When there is no PMI and RI feedback for a channel, a plurality of resources are configured in a set and a base station or a network indicates a subset of NZP CSI-RS resources through DCI for channel/interference measurement.

A resource setting and a resource setting configuration are described in more detail.

Resource Setting

Each CSI resource setting 'CSI-ResourceConfig' includes a configuration for a S≥1 CSI resource set (given by a higher layer parameter csi-RS-ResourceSetList). A CSI resource setting corresponds to CSI-RS-resourcesetlist. Here, S represents the number of configured CSI-RS resource sets. Here, a configuration for a S≥1 CSI resource set includes each CSI resource set including CSI-RS resources (configured with a NZP CSI-RS or CSI-IM) and a SS/PBCH block (SSB) resource used for L1-RSRP computation.

Each CSI resource setting is positioned at a DL BWP (bandwidth part) identified by a higher layer parameter bwp-id. In addition, all CSI resource settings linked to a CSI reporting setting have the same DL BWP.

A time domain behavior of a CSI-RS resource in a CSI resource setting included in a CSI-ResourceConfig IE may be indicated by a higher layer parameter resourceType and may be configured to be aperiodic, periodic or semi-persistent. For a periodic and semi-persistent CSI resource setting, the number (S) of configured CSI-RS resource sets is limited to '1'. For a periodic and semi-persistent CSI resource setting, configured periodicity and a slot offset are given by a numerology of an associated DL BWP as given by bwp-id.

When UE is configured with a plurality of CSI-ResourceConfigs including the same NZP CSI-RS resource ID, the same time domain behavior is configured for CSI-ResourceConfig.

When UE is configured with a plurality of CSI-ResourceConfigs including the same CSI-IM resource ID, the same time domain behavior is configured for CSI-ResourceConfig.

One or more CSI resource settings for channel measurement (CM) and interference measurement (IM) are configured through higher layer signaling as follows.

CSI-IM resource for interference measurement

NZP CSI-RS resource for interference measurement

NZP CSI-RS resource for channel measurement

In other words, a CMR (channel measurement resource) may be a NZP CSI-RS for CSI acquisition and an IMR (Interference measurement resource) may be a NZP CSI-RS for CSI-IM and IM.

In this case, CSI-IM (or a ZP CSI-RS for IM) is mainly used for inter-cell interference measurement.

In addition, an NZP CSI-RS for IM is mainly used for intra-cell interference measurement from multi-users.

UE may assume that CSI-RS resource(s) for channel measurement and CSI-IM/NZP CSI-RS resource(s) for interference measurement configured for one CSI reporting are 'QCL-TypeD' per resource.

Resource Setting Configuration

As described, a resource setting may mean a resource set list.

For aperiodic CSI, each trigger state configured by using a higher layer parameter CSI-AperiodicTriggerState is associated with one or a plurality of CSI-ReportConfigs that each CSI-ReportConfig is linked to a periodic, semi-persistent or aperiodic resource setting.

One reporting setting may be connected to up to 3 resource settings.

When one resource setting is configured, a resource setting (given by a higher layer parameter resourcesForChannelMeasurement) is about channel measurement for L1-RSRP computation.

When two resource settings are configured, a first resource setting (given by a higher layer parameter resourcesForChannelMeasurement) is for channel measurement and a second resource setting (given by csi-IM-ResourcesForInterference or nzp-CSI-RS-ResourcesForInterference) is for interference measurement performed in CSI-IM or a NZP CSI-RS.

When three resource settings are configured, a first resource setting (given by resourcesForChannelMeasurement) is for channel measurement, a second resource setting (given by csi-IM-ResourcesForInterference) is for CSI-IM based interference measurement and a third resource setting (given by nzp-CSI-RS-ResourcesForInterference) is for NZP CSI-RS based interference measurement.

For semi-persistent or periodic CSI, each CSI-ReportConfig is linked to a periodic or semi-persistent resource setting.

When one resource setting (given by resourcesForChannelMeasurement) is configured, the resource setting is about channel measurement for L1-RSRP computation.

When two resource settings are configured, a first resource setting (given by resourcesForChannelMeasurement) is for channel measurement and a second resource setting (given by a higher layer parameter csi-IM-ResourcesForInterference) is used for interference measurement performed in CSI-IM.

CSI Computation

When interference measurement is performed in CSI-IM, each CSI-RS resource for channel measurement is associated with a CSI-IM resource per resource in an order of CSI-RS resources and CSI-IM resources in a corresponding resource set. The number of CSI-RS resources for channel measurement is the same as the number of CSI-IM resources.

In addition, when interference measurement is performed in an NZP CSI-RS, UE does not expect to be configured with one or more NZP CSI-RS resources in an associated resource set in a resource setting for channel measurement.

A terminal configured with a higher layer parameter nzp-CSI-RS-ResourcesForInterference does not expect that 18 or more NZP CSI-RS ports will be configured in a NZP CSI-RS resource set.

For CSI measurement, a terminal assumes the followings.

Each NZP CSI-RS port configured for interference measurement corresponds to an interference transmission layer.

All interference transmission layers of an NZP CSI-RS port for interference measurement consider EPRE (energy per resource element) ratio.

A different interference signal in RE(s) of an NZP CSI-RS resource for channel measurement, an NZP CSI-RS resource for interference measurement or a CSI-IM resource for interference measurement CSI Report For a CSI report, a time and frequency resource which may be used by UE are controlled by a base station.

CSI (channel state information) may include at least one of a channel quality indicator (CQI), a precoding matrix indicator (PMI), a CSI-RS resource indicator (CRI), a SS/PBCH block resource indicator (SSBRI), a layer indicator (LI), a rank indicator (RI) or L1-RSRP.

For CQI, PMI, CRI, SSBRI, LI, RI, L1-RSRP, a terminal is configured by a higher layer with N≥1 CSI-ReportConfig reporting setting, M≥1 CSI-ResourceConfig resource setting and a list of one or two trigger states (provided by aperiodicTriggerStateList and semiPersistentOnPUSCH-TriggerStateList). Each trigger state in the aperiodicTriggerStateList includes a associated CSI-ReportConfigs list which indicates a channel and optional resource set IDs for interference. In semiPersistentOnPUSCH-TriggerStateList, one associated CSI-ReportConfig is included in each trigger state.

In addition, a time domain behavior of CSI reporting supports periodic, semi-persistent, aperiodic.

i) Periodic CSI reporting is performed in a short PUCCH, a long PUCCH. Periodicity and a slot offset of periodic CSI reporting may be configured by RRC and refers to a CSI-ReportConfig IE.

ii) SP (semi-periodic) CSI reporting is performed in a short PUCCH, a long PUCCH, or a PUSCH.

For SP CSI in a short/long PUCCH, periodicity and a slot offset are configured by RRC and a CSI report is activated/deactivated by separate MAC CE/DCI.

For SP CSI in a PUSCH, periodicity of SP CSI reporting is configured by RRC, but a slot offset is not configured by RRC and SP CSI reporting is activated/deactivated by DCI (format 0_1). For SP CSI reporting in a PUSCH, a separated RNTI (SP-CSI C-RNTI) is used.

An initial CSI report timing follows a PUSCH time domain allocation value indicated by DCI and a subsequent CSI report timing follows a periodicity configured by RRC.

DCI format 0_1 may include a CSI request field and activate/deactivate a specific configured SP-CSI trigger state. SP CSI reporting has activation/deactivation equal or similar to a mechanism having data transmission in a SPS PUSCH.

iii) Aperiodic CSI reporting is performed in a PUSCH and is triggered by DCI. In this case, information related to trigger of aperiodic CSI reporting may be delivered/indicated/configured through MAC-CE.

For AP CSI having an AP CSI-RS, AP CSI-RS timing is configured by RRC and timing for AP CSI reporting is dynamically controlled by DCI.

In NR, a method of dividing and reporting CSI in a plurality of reporting instances applied to a PUCCH based CSI report in LTE (e.g., transmitted in an order of RI, WB PMI/CQI, SB PMI/CQI) is not applied. Instead, in NR, there is a limit that a specific CSI report is not configured in a short/long PUCCH and a CSI omission rule is defined. In addition, regarding AP CSI reporting timing, a PUSCH symbol/slot location is dynamically indicated by DCI. In addition, candidate slot offsets are configured by RRC. For CSI reporting, a slot offset (Y) is configured per reporting setting. For UL-SCH, a slot offset K2 is separately configured.

2 CSI latency classes (low latency class, high latency class) are defined with regard to CSI computation complexity. Low latency CSI is WB CSI which includes up to 4 ports Type-I codebooks or up to 4 ports non-PMI feedback CSI. High latency CSI refers to CSI other than low latency CSI. For a normal terminal, (Z, Z') is defined in a unit of OFDM symbols. Here, Z represents the minimum CSI processing time until a CSI report is performed after receiving aperiodic CSI triggering DCI. In addition, Z' refers to the minimum CSI processing time until a CSI report is performed after receiving a CSI-RS for a channel/interference.

Additionally, a terminal reports the number of CSI which may be calculated at the same time.

Quasi-Co Location (QCL)

An antenna port is defined so that a channel where a symbol in an antenna port is transmitted can be inferred from a channel where other symbol in the same antenna port is transmitted. When a property of a channel where a symbol in one antenna port is carried may be inferred from a channel where a symbol in other antenna port is carried, it may be said that 2 antenna ports are in a QC/QCL (quasi co-located or quasi co-location) relationship.

Here, the channel property includes at least one of delay spread, doppler spread, frequency/doppler shift, average received power, received timing/average delay, or a spatial RX parameter. Here, a spatial Rx parameter means a spatial (Rx) channel property parameter such as an angle of arrival.

A terminal may be configured at list of up to M TCI-State configurations in a higher layer parameter PDSCH-Config to decode a PDSCH according to a detected PDCCH having intended DCI for a corresponding terminal and a given serving cell. The M depends on UE capability.

Each TCI-State includes a parameter for configuring a quasi co-location relationship between ports of one or two DL reference signals and a DM-RS (demodulation reference signal) of a PDSCH.

A quasi co-location relationship is configured by a higher layer parameter qcl-Type1 for a first DL RS and qcl-Type2 for a second DL RS (if configured). For two DL RSs, a QCL type is not the same regardless of whether a reference is a same DL RS or a different DL RS.

A QCL type corresponding to each DL RS is given by a higher layer parameter qcl-Type of QCL-Info and may take one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, when a target antenna port is a specific NZP CSI-RS, it may be indicated/configured that a corresponding NZP CSI-RS antenna port is quasi-colocated with a specific TRS with regard to QCL-Type A and is quasi-colocated with a specific SSB with regard to QCL-Type D. A terminal received such indication/configuration may receive a corresponding NZP CSI-RS by using a doppler, delay value measured in a QCL-TypeA TRS and apply a Rx beam used for receiving QCL-TypeD SSB to reception of a corresponding NZP CSI-RS.

UE may receive an activation command by MAC CE signaling used to map up to 8 TCI states to a codepoint of a DCI field 'Transmission Configuration Indication'.

When HARQ-ACK corresponding to a PDSCH carrying an activation command is transmitted in a slot n, mapping indicated between a TCI state and a codepoint of a DCI field 'Transmission Configuration Indication' may be applied by starting from a slot $n+3N_{slot}^{subframe,\mu}+1$. After UE receives an initial higher layer configuration for TCI states before receiving an activation command, UE may assume for QCL-TypeA, and if applicable, for QCL-TypeD that a DMRS port of a PDSCH of a serving cell is quasi-colocated with a SS/PBCH block determined in an initial access process.

When a higher layer parameter (e.g., tci-PresentInDCI) indicating whether there is a TCI field in DCI configured for UE is set to be enabled for a CORESET scheduling a PDSCH, UE may assume that there is a TCI field in DCI format 1_1 of a PDCCH transmitted in a corresponding CORESET. When tci-PresentInDCI is not configured for a CORESET scheduling a PDSCH or when a PDSCH is scheduled by DCI format 1_0 and a time offset between reception of DL DCI and a corresponding PDSCH is equal to or greater than a predetermined threshold (e.g., timeDurationForQCL), in order to determine a PDSCH antenna port QCL, UE may assume that a TCI state or a QCL assumption for a PDSCH is the same as a TCI state or a QCL assumption applied to a CORESET used for PDCCH transmission. Here, the predetermined threshold may be based on reported UE capability.

When a parameter tci-PresentInDCI is set to be enabled, a TCI field in DCI in a scheduling CC (component carrier) may indicate an activated TCI state of a scheduled CC or a DL BWP. When a PDSCH is scheduled by DCI format 1_1, UE may use a TCI-state according to a value of a 'Transmission Configuration Indication' field of a detected PDCCH having DCI to determine a PDSCH antenna port QCL.

When a time offset between reception of DL DCI and a corresponding PDSCH is equal to or greater than a predetermined threshold (e.g., timeDurationForQCL), UE may assume that a DMRS port of a PDSCH of a serving cell is quasi-colocated with RS(s) in a TCI state for QCL type parameter(s) given by an indicated TCI state.

When a single slot PDSCH is configured for UE, an indicated TCI state may be based on an activated TCI state of a slot having a scheduled PDSCH.

When multiple-slot PDSCHs are configured for UE, an indicated TCI state may be based on an activated TCI state of a first slot having a scheduled PDSCH and UE may expect that activated TCI states across slots having a scheduled PDSCH are the same.

When a CORESET associated with a search space set for cross-carrier scheduling is configured for UE, UE may expect that a tci-PresentInDCI parameter is set to be enabled for a corresponding CORESET. When one or more TCI states are configured for a serving cell scheduled by a search space set including QCL-TypeD, UE may expect that a time offset between reception of a PDCCH detected in the search space set and a corresponding PDSCH is equal to or greater than a predetermined threshold (e.g., timeDurationForQCL).

For both of a case in which a parameter tci-PresentInDCI is set to be enabled and a case in which tci-PresentInDCI is not configured in a RRC connected mode, when a time offset between reception of DL DCI and a corresponding PDSCH is less than a predetermined threshold (e.g., timeDuration-ForQCL), UE may assume that a DMRS port of a PDSCH of a serving cell is quasi-colocated with RS(s) for QCL parameter(s) used for PDCCH QCL indication of a CORE-SET associated with a monitored search space having the lowest CORESET-ID in the latest slot where one or more CORESETs in an activated BWP of a serving cell is monitored by UE.

In this case, when QCL-TypeD of a PDSCH DMRS is different from QCL-TypeD of a PDCCH DMRS and they are overlapped in at least one symbol, UE may expect that reception of a PDCCH associated with a corresponding CORESET will be prioritized. It may be also applied to intra-band CA (carrier aggregation) (when a PDSCH and a CORESET exist in a different CC). When any of configured TCI states does not include QCL-TypeD, a different QCL assumption may be obtained from TCI states indicated for a scheduled PDSCH, regardless of a time offset between reception of DL DCI and a corresponding PDSCH.

For a periodic CSI-RS resource of configured NZP-CSI-RS-ResourceSet including a higher layer parameter trs-Info, UE may expect a TCI state to indicate one of the following QCL type(s).

QCL-TypeC with a SS/PBCH block, and if applicable, QCL-TypeD with the same SS/PBCH block, or QCL-TypeC with a SS/PBCH block, and if applicable, QCL-TypeD with a CSI-RS resource in configured NZP-CSI-RS-ResourceSet including a higher layer parameter repetition For an aperiodic CSI-RS resource of configured NZP-CSI-RS-ResourceSet including a higher layer parameter trs-Info, UE may expect a TCI state to indicate QCL-TypeA with a periodic CSI-RS resource of NZP-CSI-RS-ResourceSet including a higher layer parameter trs-Info, and if applicable, QCL-TypeD with the same periodic CSI-RS resource.

For a CSI-RS resource of NZP-CSI-RS-ResourceSet configured without a higher layer parameter trs-Info and without a higher layer parameter repetition, UE may expect a TCI state to indicate one of the following QCL type(s).

QCL-TypeA with a CSI-RS resource of configured NZP-CSI-RS-ResourceSet including a higher layer parameter trs-Info, and if applicable, QCL-TypeD with the same CSI-RS resource, or QCL-TypeA with a CSI-RS resource of configured NZP-CSI-RS-ResourceSet including a higher layer parameter trs-Info, and if applicable, QCL-TypeD with a SS/PBCH block, or QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or when QCL-TypeD is not applicable, QCL-TypeB with a CSI-RS resource in configured NZP-CSI-RS-ResourceSet including a higher layer parameter trs-Info.

For a CSI-RS resource of configured NZP-CSI-RS-ResourceSet including a higher layer parameter repetition, UE may expect a TCI state to indicate one of the following QCL type(s).

QCL-TypeA with a CSI-RS resource of configured NZP-CSI-RS-ResourceSet including a higher layer parameter trs-Info, and if applicable, QCL-TypeD with the same CSI-RS resource, or QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or QCL-TypeC with a SS/PBCH block, and if applicable, QCL-TypeD with the same SS/PBCH block.

For a DMRS of a PDCCH, UE may expect a TCI state to indicate one of the following QCL type(s).

QCL-TypeA with a CSI-RS resource of configured NZP-CSI-RS-ResourceSet including a higher layer parameter trs-Info, and if applicable, QCL-TypeD with the same CSI-RS resource, or QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or QCL-TypeA with a CSI-RS resource of NZP-CSI-RS-ResourceSet configured without a higher layer parameter trs-Info and without a higher layer parameter repetition, and if applicable, QCL-TypeD with the same CSI-RS resource.

For a DMRS of a PDSCH, UE may expect a TCI state to indicate one of the following QCL type(s).

QCL-TypeA with a CSI-RS resource of configured NZP-CSI-RS-ResourceSet including a higher layer parameter trs-Info, and if applicable, QCL-TypeD with the same CSI-RS resource, or QCL-TypeA with a CSI-RS resource of configured NZP-CSI-RS-ResourceSet including a higher layer parameter trs-Info, and if applicable, QCL-TypeD with a CSI-RS resource in configured NZP-CSI-RS-ResourceSet including a higher layer parameter repetition, or QCL-TypeA with a CSI-RS resource of NZP-CSI-RS-ResourceSet configured without a higher layer parameter trs-Info and without a higher layer parameter repetition, and if applicable, QCL-TypeD with the same CSI-RS resource.

Operation Related to Multi-TRPs

A coordinated multi point (CoMP) scheme refers to a scheme in which a plurality of base stations effectively control interference by exchanging (e.g., using an X2 interface) or utilizing channel information (e.g., RI/CQI/PMI/LI (layer indicator), etc.) fed back by a terminal and cooperatively transmitting to a terminal. According to a scheme used, a CoMP may be classified into joint transmission (JT), coordinated Scheduling (CS), coordinated Beamforming (CB), dynamic Point Selection (DPS), dynamic Point Blocking (DPB), etc.

M-TRP transmission schemes that M TRPs transmit data to one terminal may be largely classified into i) eMBB M-TRP transmission, a scheme for improving a transfer rate, and ii) URLLC M-TRP transmission, a scheme for increasing a reception success rate and reducing latency.

In addition, with regard to DCI transmission, M-TRP transmission schemes may be classified into i) M-TRP transmission based on M-DCI (multiple DCI) that each TRP transmits different DCIs and ii) M-TRP transmission based on S-DCI (single DCI) that one TRP transmits DCI. For example, for S-DCI based M-TRP transmission, all scheduling information on data transmitted by M TRPs should be delivered to a terminal through one DCI, it may be used in an environment of an ideal BackHaul (ideal BH) where dynamic cooperation between two TRPs is possible.

For TDM based URLLC M-TRP transmission, scheme ¾ is under discussion for standardization. Specifically, scheme 4 means a scheme in which one TRP transmits a transport block (TB) in one slot and it has an effect to improve a probability of data reception through the same TB received from multiple TRPs in multiple slots. Meanwhile, scheme 3 means a scheme in which one TRP transmits a TB through consecutive number of OFDM symbols (i.e., a symbol group) and TRPs may be configured to transmit the same TB through a different symbol group in one slot.

In addition, UE may recognize PUSCH (or PUCCH) scheduled by DCI received in different control resource sets (CORESETs) (or CORESETs belonging to different CORESET groups) as PUSCH (or PUCCH) transmitted to different TRPs or may recognize PDSCH (or PDCCH) from different TRPs. In addition, the below-described method for UL transmission (e.g., PUSCH/PUCCH) transmitted to different TRPs may be applied equivalently to UL transmission (e.g., PUSCH/PUCCH)transmitted to different panels belonging to the same TRP.

MTRP-URLLC may mean that a M TRPs transmit the same transport block (TB) by using different layer/time/ frequency. A UE configured with a MTRP-URLLC transmission scheme receives an indication on multiple TCI state(s) through DCI and may assume that data received by using a QCL RS of each TCI state are the same TB.

MTRP-eMBB may mean that M TRPs transmit different TBs by using different layer/time/frequency. A UE configured with a MTRP-eMBB transmission scheme receives an indication on multiple TCI state(s) through DCI and may assume that data received by using a QCL RS of each TCI state are different TBs.

As UE separately classifies and uses a RNTI configured for MTRP-URLLC and a RNTI configured for MTRP-eMBB, it may decide/determine whether the corresponding M-TRP transmission is URLLC transmission or eMBB transmission. In other words, when CRC masking of DCI received by UE is performed by using a RNTI configured for MTRP-URLLC, it may correspond to URLLC transmission, and when CRC masking of DCI is performed by using a RNTI configured for MTRP-URLLC, it may correspond to eMBB transmission.

Hereinafter, multiple DCI based non-coherent joint transmission (NCJT)/single DCI based NCJT will be described.

NCJT (Non-coherent joint transmission) is a scheme in which a plurality of transmission points (TP) transmit data to one terminal by using the same time frequency resource, TPs transmit data by using a different DMRS (Demodulation Multiplexing Reference Signal) between TPs through a different layer (i.e., through a different DMRS port).

A TP delivers data scheduling information through DCI to a terminal receiving NCJT. Here, a scheme in which each TP participating in NCJT delivers scheduling information on data transmitted by itself through DCI is referred to as 'multi DCI based NCJT'. As each of N TPs participating in NCJT transmission transmits DL grant DCI and a PDSCH to UE, UE receives N DCI and N PDSCHs from N TPs. Meanwhile, a scheme in which one representative TP delivers scheduling information on data transmitted by itself and data transmitted by a different TP (i.e., a TP participating in NCJT) through one DCI is referred to as 'single DCI based NCJT'. Here, N TPs transmit one PDSCH, but each TP transmits only some layers of multiple layers included in one PDSCH. For example, when 4-layer data is transmitted, TP 1 may transmit 2 layers and TP 2 may transmit 2 remaining layers to UE.

Multiple TRPs (MTRPs) performing NCJT transmission may transmit DL data to a terminal by using any one scheme of the following two schemes.

First, a single DCI based MTRP scheme is described. MTRPs cooperatively transmit one common PDSCH and each TRP participating in cooperative transmission spatially partitions and transmits a corresponding PDSCH into different layers (i.e., different DMRS ports) by using the same time frequency resource. Here, scheduling information on the PDSCH is indicated to UE through one DCI and which DMRS (group) port uses which QCL RS and QCL type information is indicated by the corresponding DCI (which is different from DCI indicating a QCL RS and a type which will be commonly applied to all DMRS ports indicated as in the existing scheme). In other words, M TCI states may be indicated through a TCI (Transmission Configuration Indicator) field in DCI (e.g., for 2 TRP cooperative transmission, M=2) and a QCL RS and a type may be indicated by using M different TCI states for M DMRS port group. In addition, DMRS port information may be indicated by using a new DMRS table.

Next, 'a multiple DCI based MTRP scheme' is described. Each of MTRPs transmits different DCI and PDSCH and (part or all of) the corresponding PDSCHs are overlapped each other and transmitted in a frequency time resource. Corresponding PDSCHs may be scrambled through a different scrambling ID (identifier) and the DCI may be transmitted through a CORESET belonging to a different CORESET group. (Here, a CORESET group may be identified by an index defined in a CORESET configuration of each CORESET. For example, when index=0 is configured for CORESETs 1 and 2 and index=1 is configured for CORESETs 3 and 4, CORESETs 1 and 2 are CORESET group 0 and CORESET 3 and 4 belong to a CORESET group 1. In addition, when an index is not defined in a CORESET, it may be construed as index=0) When a plurality of scrambling IDs are configured or two or more CORESET groups are configured in one serving cell, a UE may notice that it receives data according to a multiple DCI based MTRP operation.

Alternatively, whether of a single DCI based MTRP scheme or a multiple DCI based MTRP scheme may be indicated to UE through separate signaling. In an example, for one serving cell, a plurality of CRS (cell reference signal) patterns may be indicated to UE for a MTRP operation. In this case, PDSCH rate matching for a CRS may be different depending on a single DCI based MTRP scheme or a multiple DCI based MTRP scheme (because a CRS pattern is different).

Hereinafter, a CORESET group ID described/mentioned in the present disclosure may mean an index/identification information (e.g., an ID, etc.) for distinguishing a CORESET for each TRP/panel. In addition, a CORESET group may be a group/union of CORESET distinguished by an index/identification information (e.g., an ID)/the CORESET group ID, etc. for distinguishing a CORESET for each TRP/panel. In an example, a CORESET group ID may be specific index information defined in a CORESET configuration. In this case, a CORESET group may be configured/indicated/defined by an index defined in a CORESET configuration for each CORESET. Additionally/alternatively, a CORESET group ID may mean an index/identification information/an indicator, etc. for distinguishment/identification between CORESETs configured/associated with each TRP/panel. Hereinafter, a CORESET group ID described/mentioned in the present disclosure may be expressed by being substituted with a specific index/specific identification information/a specific indicator for distinguishment/identification between CORESETs configured/associated with each TRP/panel. The CORESET group ID, i.e., a specific index/specific identification information/a specific indicator for distinguishment/identification between CORESETs configured/associated with each TRP/panel may be configured/indicated to a terminal through higher layer signaling (e.g., RRC signaling)/L2 signaling (e.g., MAC-CE)/L1 signaling (e.g., DCI), etc. In an example, it may be configured/indicated so that PDCCH detection will be performed per each TRP/panel in a unit of a corresponding CORESET group (i.e., per TRP/panel belonging to the same CORESET group). Additionally/alternatively, it may be configured/indicated so that uplink control information (e.g., CSI, HARQ-A/N (ACK/NACK), SR (scheduling request)) and/or uplink physical channel resources (e.g., PUCCH/PRACH/SRS resources) are separated and managed/controlled per each TRP/panel in a unit of a corresponding CORESET group (i.e., per TRP/panel belonging to the same CORESET group). Additionally/alternatively, HARQ A/N (process/retransmission) for PDSCH/PUSCH, etc. scheduled per each TRP/panel may be managed per corresponding CORESET group (i.e., per TRP/panel belonging to the same CORESET group).

Hereinafter, partially overlapped NCJT will be described.

In addition, NCJT may be classified into fully overlapped NCJT that time frequency resources transmitted by each TP are fully overlapped and partially overlapped NCJT that only some time frequency resources are overlapped. In other words, for partially overlapped NCJT, data of both of TP 1 and TP 2 are transmitted in some time frequency resources and data of only one TP of TP 1 or TP 2 is transmitted in remaining time frequency resources.

Hereinafter, a method for improving reliability in Multi-TRP will be described.

As a transmission and reception method for improving reliability using transmission in a plurality of TRPs, the following two methods may be considered.

Figures 15A, 15B:
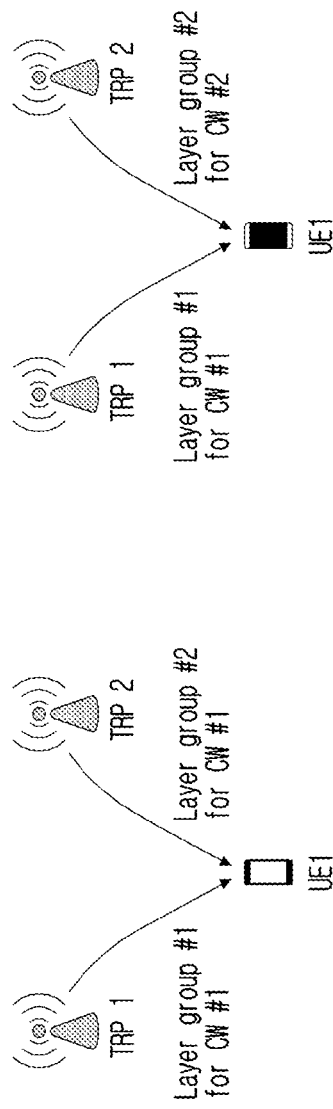
FIGS. 15A and 15B illustrate a method of transmitting multiple TRPs in a wireless communication system to which the present disclosure may be applied.

FIGS. 15A and 15B illustrate a method of multiple TRPs transmission in a wireless communication system to which the present disclosure may be applied.

In reference to FIG. 15A, it is shown a case in which layer groups transmitting the same codeword (CW)/transport block (TB) correspond to different TRPs. Here, a layer group may mean a predetermined layer set including one or more layers. In this case, there is an advantage that the amount of transmitted resources increases due to the number of a plurality of layers and thereby a robust channel coding with a low coding rate may be used for a TB, and additionally, because a plurality of TRPs have different channels, it may be expected to improve reliability of a received signal based on a diversity gain.

In reference to FIG. 15B, an example that different CWs are transmitted through layer groups corresponding to different TRPs is shown. Here, it may be assumed that a TB corresponding to CW #1 and CW #2 in the drawing is identical to each other. In other words, CW #1 and CW #2 mean that the same TB is respectively transformed through channel coding, etc. into different CWs by different TRPs. Accordingly, it may be considered as an example that the same TB is repetitively transmitted. In case of FIG. 15B, it may have a disadvantage that a code rate corresponding to a TB is higher compared to FIG. 15A. However, it has an advantage that it may adjust a code rate by indicating a different RV (redundancy version) value or may adjust a modulation order of each CW for encoded bits generated from the same TB according to a channel environment.

According to methods illustrated in FIGS. 15A and 15B above, probability of data reception of a terminal may be improved as the same TB is repetitively transmitted through a different layer group and each layer group is transmitted by a different TRP/panel. It is referred to as a SDM (Spatial Division Multiplexing) based M-TRP URLLC transmission method. Layers belonging to different layer groups are respectively transmitted through DMRS ports belonging to different DMRS CDM groups.

In addition, the above-described contents related to multiple TRPs are described based on an SDM (spatial division multiplexing) method using different layers, but it may be naturally extended and applied to a FDM (frequency division multiplexing) method based on a different frequency domain resource (e.g., RB/PRB (set), etc.) and/or a TDM (time division multiplexing) method based on a different time domain resource (e.g., a slot, a symbol, a sub-symbol, etc.).

Regarding a method for multiple TRPs based URLLC scheduled by single DCI, the following methods are discussed.

1) Method 1 (SDM): Time and frequency resource allocation is overlapped and n (n<=Ns) TCI states in a single slot 1-a) Method 1a The same TB is transmitted in one layer or layer set at each transmission time (occasion) and each layer or each layer set is associated with one TCI and one set of DMRS port(s).

A single codeword having one RV is used in all spatial layers or all layer sets. With regard to UE, different coded bits are mapped to a different layer or layer set by using the same mapping rule.

1-b) Method 1b

The same TB is transmitted in one layer or layer set at each transmission time (occasion) and each layer or each layer set is associated with one TCI and one set of DMRS port(s).

A single codeword having one RV is used in each spatial layer or each layer set. RV(s) corresponding to each spatial layer or each layer set may be the same or different.

1-c) Method 1c

The same TB having one DMRS port associated with multiple TCI state indexes is transmitted in one layer at one transmission time (occasion) or the same TB having multiple DMRS ports one-to-one associated with multiple TCI state indexes is transmitted in one layer.

In case of the above-described method 1a and 1c, the same MCS is applied to all layers or all layer sets.

2) Method 2 (FDM): Frequency resource allocation is not overlapped and n (n<=Nf) TCI states in a single slot Each non-overlapping frequency resource allocation is associated with one TCI state.

The same single/multiple DMRS port(s) are associated with all non-overlapping frequency resource allocation.

2-a) Method 2a

A single codeword having one RV is used for all resource allocation. With regard to UE, common RB matching (mapping of a codeword to a layer) is applied to all resource allocation.

2-b) Method 2b

A single codeword having one RV is used for each non-overlapping frequency resource allocation. A RV corresponding to each non-overlapping frequency resource allocation may be the same or different.

For the above-described method 2a, the same MCS is applied to all non-overlapping frequency resource allocation.

3) Method 3 (TDM): Time resource allocation is not overlapped and n (n<=Nt1) TCI states in a single slot Each transmission time (occasion) of a TB has time granularity of a mini-slot and has one TCI and one RV.

A common MCS is used with a single or multiple DMRS port(s) at all transmission time (occasion) in a slot.

A RV/TCI may be the same or different at a different transmission time (occasion).

4) Method 4 (TDM): n (n<=Nt2) TCI states in K (n<=K) different slots

Each transmission time (occasion) of a TB has one TCI and one RV.

All transmission time (occasion) across K slots uses a common MCS with a single or multiple DMRS port(s).

A RV/TCI may be the same or different at a different transmission time (occasion).

QCL Related Configuration for Downlink Transmission and Reception

For an TCI indication, each TCI codepoint in DCI may correspond to 1 TCI state or a plurality of TCI states. For example, when a plurality of TCI states in one TCI codepoint are activated, each of a plurality of TCI states may correspond to one CDM group.

Each configured TCI state may include one downlink RS or a plurality of downlink RSs and may include an associated QCL type (qcl-Type) for each downlink RS. A QCL type may include a first type related to a channel property (e.g., Doppler shift, Doppler spread, average delay, delay spread, etc.) and a second type related to a spatial Rx parameter. For example, a first QCL type may include at least one of the above-described QCL-TypeA, QCL-TypeB, or QCL-TypeC. A second QCL type my include the above-described QCL-TypeD.

In the following examples, it is described by referring to terms of QCL-TypeA, QCL-TypeB, QCL-TypeC, and QCL-TypeD, but a scope of the present disclosure is not limited thereto, and examples in the present disclosure may be applied based on what property a QCL type has.

RSs (i.e., a QCL RS) in a QCL relationship with PDSCH or PDSCH DMRS may be defined as in the following Table 9.

TABLE 9

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | CSI-RS (CSI) | QCL-TypeD |
| 4 | SS/PBCH block | QCL-TypeA | SS/PBCH block | QCL-TypeD |

For a target PDSCH DMRS, UE may expect configuration 1, 2, 3 for a TCI-state in Table 9. Configuration 4 in Table 9 corresponds to a valid default configuration before a TRS is configured, which corresponds to a valid QCL assumption rather than a TCI state. In addition, a QCL parameter may not be directly derived from a CSI-RS (CSI).

SFN (Single Frequency Network) transmission includes a method that a plurality of TRPs transmit the same data layer by using the same frequency/time/spatial (or layer or antenna port) resource. A data layer transmitted by each TRP is added over the air and received by UE. Accordingly, an effect of boosting data transmission power may be obtained, and as the same data is transmitted through a variety of DL channels, probability of reception may be improved by a diversity gain. Such an SFN method may be utilized for data transmission of a HST (high speed train).

In the present disclosure, when a specific TCI state (or TCI) is used (or mapped) in transmitting and receiving data/DCI/UCI for a frequency/time/spatial resource, it means as follows. For a DL, it may mean that a channel is estimated from a DMRS by using a QCL type and a QCL RS indicated by a corresponding TCI state in that frequency/time/spatial resource and data/DCI is received/demodulated based on an estimated channel. In addition, for a UL, it may mean that a DMRS and data/UCI are transmitted/modulated by using a Tx beam and/or power indicated by a corresponding TCI state in that frequency/time/spatial resource.

Examples in the present disclosure are described based on a "TRP", but as described above, those may be applied with a substituting a "TRP" with an expression such as a panel, a beam, a cell, a transmission point (TP), a base station (gNB, etc.), etc. In addition, as described above, a TRP may be distinguished according to information (e.g., an index) on a CORESET group (or a CORESET pool). In an example, when one terminal is configured to perform transmission and reception with multiple TRPs (or cells), it may mean that multiple CORESET groups (or CORESET pools) are configured for one terminal. Such a configuration on a CORESET group (or a CORESET pool) may be performed through higher layer signaling (e.g., RRC signaling, etc.). In addition, when multiple CORESET groups are configured for one terminal, a corresponding terminal may be configured or defined to receive data by using a multi DCI based M-TRP operation.

Examples in the present disclosure, for convenience of description, are described on the assumption that 2 TRPs transmit and receive a single layer of the same data by a SFN method, but a scope of the present disclosure is not limited thereto, and it may be also applied to transmission and reception of 3 or more multiple TRPs (or multiple panels/multiple beams/multiple cells, etc.). A different TRP/panel/beam/cell, etc. may be recognized as a different TCI state to UE. In other words, for examples in the present disclosure, when UE receives/transmits data/DCI/UCI by using a TCI state index X, it may mean that data/DCI/UCI is received/transmitted from/to a TRP index X and vice versa. For example, the number of TRPs may be transparent to UE and UE may transmit and receive an uplink/downlink signal based on activated TCI state(s).

When 2 TRPs transmit the same data through a single layer by a SFN method, UE may get an indication on one DMRS port and may get an indication on a QCL RS used in the corresponding DMRS port. For example, UE may be configured with one QCL type A RS for estimating a DMRS channel and optimize a DL channel estimation filter based on a corresponding RS, and if necessary, it may be additionally configured with a QCL type D RS, and receive a DMRS and data by using a Rx beam of a corresponding RS. In other words, one QCL RS may be configured for one QCL type for UE. But, for MTRP transmission, a channel from each TRP to UE is different, so there is a problem that performance (or accuracy) of channel estimation of UE is not enough only with one QCL RS.

Accordingly, it is required to configure an additional QCL RS in addition to existing one QCL RS to UE for QCL type A in order to improve channel estimation performance of UE. For example, an additional QCL RS may be the same type as the existing QCL type, i.e., type A, or may be type B or type C other than type A. UE may calculate Doppler shift, Doppler spread, average delay, delay spread value, etc. through a plurality of QCL RSs configured as above and perform DMRS channel estimation by using these values.

Meanwhile, unlike QCL type A/B/C related to a channel property, QCL type D is related to a spatial Rx parameter of a terminal, so it may be improper to configure a plurality of QCL RSs for QCL type D like QCL type A/B/C.

Accordingly, the present disclosure describes specific examples on a QCL RS configuration on QCL type D for a Rx beam and thereby provides an improved method of a QCL RS configuration.

Figure 16:
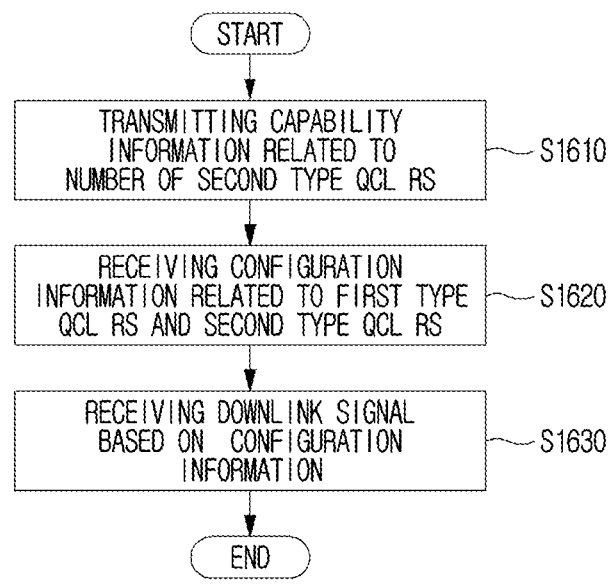
FIG. 16 is a flow chart for describing a downlink reception operation of a terminal according to the present disclosure.

FIG. 16 is a flow chart for describing a downlink reception operation of a terminal according to the present disclosure.

In S1610, UE may transmit capability information to a network (e.g., a base station). Capability information may include information related to the number of second type QCL RSs supported by UE.

For example, UE may be equipped with multiple receiving means or may be equipped with a single receiving means and accordingly, UE capability (e.g., the number of supported second type QCL RSs) may be different. For example, a receiving means may correspond to at least one of an antenna array, a panel, or a beam.

In addition, for UE equipped with multiple receiving means, only some or single receiving means may be activated at a specific time (or time duration) or in a specific situation (or condition). UE capability information may include information on the number of second type QCL RS supported by UE for each of one or more specific time/time durations/time units/situations/conditions. In addition, UE capability information may include information on the number of second type QCL RS supported by UE without a limitation of a time/time duration/time unit/situation/condition. For example, UE capability information may be updated or reported through long-term based higher layer signaling (e.g., RRC signaling). UE may assume that UE capability information which is updated/reported most recently is applied until UE capability information is updated/reported.

In S1620, UE may receive QCL related configuration information from a network. QCL related configuration information may include configuration information on a QCL RS for a first type QCL (i.e., a first type QCL RS) and a QCL RS for a second type QCL (i.e., a second type QCL RS).

Here, QCL related configuration information may include information on candidate(s) of a QCL configuration which is provided by higher layer (e.g., RRC and/or MAC-CE) signaling and to be applied to UE (e.g., configuration information on one or more TCI states) and/or an activated QCL configuration provided through DCI (e.g., an indication on one or more TCI states).

In addition, QCL related configuration information may be configured based on UE capability information. In other words, QCL related configuration information on UE may be provided based on the number of second type QCL RSs supported by corresponding UE associated with the number of receiving means equipped with UE or activated in UE. For example, QCL related configuration information may include information on a QCL RS per QCL type for each of one or more specific time/time duration/time units/situations/conditions. In addition, QCL-related configuration information may include information on a QCL RS per QCL type without a limitation of time/time duration/time unit/situation/condition.

In S1630, UE may receive a downlink signal based on QCL related configuration information. A downlink signal may include one or more of PDSCH (or PDSCH DMRS), PDCCH (or PDCCH DMRS), CSI-RS, TRS, or SS/PBCH block.

Figure 17:
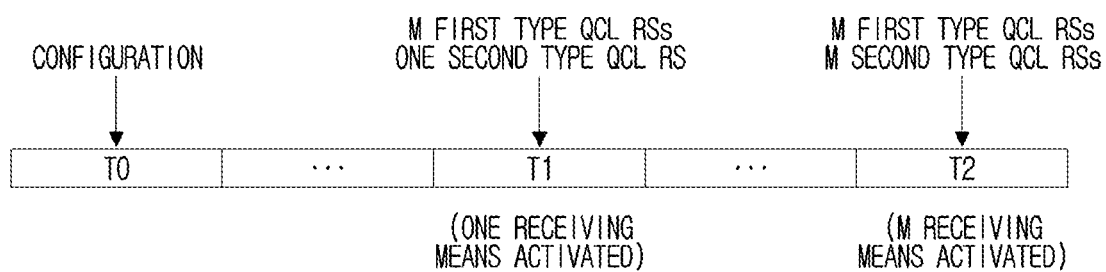
FIG. 17 is a diagram for describing an embodiment on application of QCL configuration according to the present disclosure.

FIG. 17 is a diagram for describing an embodiment on application of QCL configuration according to the present disclosure.

In an example of FIG. 17, T0, T1, T2 represent an index of a time unit. For example, a time unit may be defined as one or a combination of two or more of a symbol, a symbol group, a slot, a slot group, a subframe, a subframe group, a radio frame or a radio frame group.

UE may receive QCL related configuration information from a network in T0. As described above, QCL related configuration information may include information on a QCL RS per QCL type configured based on the number of receiving means activated in a specific time unit or terminal. For example, a receiving means may correspond to one or more of an antenna array, a panel or a beam.

For example, T1 may correspond to a case in which one receiving means is activated in UE. For T1, the QCL related configuration information may indicate M (M is an integer equal to or greater than 2) first type QCL RSs and one second type QCL RS, and based thereon, UE may receive a downlink signal (by a SFN method) from M TRPs.

For example, T2 may correspond to a case in which M receiving means are activated in UE. For T2, the QCL related configuration information may indicate M first type QCL RSs and M second type QCL RSs, and based thereon, UE may receive a downlink signal (by a SFN method) from M TRPs.

In an example of FIG. 17, it is described on the assumption that the number of receiving means equipped/activated by the same UE is different at a specific time (or time duration), but a scope of the present disclosure is not limited thereto, and a UE in an example of T1 and a UE in an example of T2 may correspond to different UEs having different capability (e.g., UE1 in the example of T1 example, UE2 in the example of T2). In this case, QCL related configuration information based on corresponding UE capability may be provided for each of UE1 and UE2 in T0.

In the following examples, it is described on the assumption that a panel is a representative example on a receiving means of UE, but a scope of the present disclosure is not limited thereto, and the same examples may be also applied to other receiving means units such as an antenna array, a beam, etc.

Embodiment 1

This embodiment is about a QCL RS configuration method for single panel UE (i.e., UE equipped with a single panel or UE equipped with a plurality of panels, but with single panel activated).

Single panel UE may perform reception through one beam (or Rx beam direction) in one time unit, so only one second type QCL RS (e.g., a QCL type D RS) may be configured. In other words, a plurality of QCL RSs corresponding to a plurality of TRPs may be configured for other types (i.e., a first type, e.g., QCL type A, B, or C) than a second type and only one second type QCL RS may be configured.

UE may receive DMRS/PDSCH through one QCL type D RS and perform channel estimation by using Doppler shift, Doppler spread, average delay, delay spread value, etc. computed by a plurality of QCL type A/B/C RSs.

Embodiment 1-1

To indicate an RS in a QCL relationship with a DMRS to single panel UE, a base station may configure a plurality of TCI states to UE (e.g., through TCI field(s) in DCI). For example, it is assumed that a base station configures TCI state 1 corresponding to TRP 1 and TCI state 2 corresponding to TRP 2 to UE.

In this case, all second type QCL RSs included in a plurality of TCI states may be configured to be the same, or may be configured to be different but only a second type QCL RS configured for one TCI state (e.g., a reference TCI state) thereof may be applied. Alternatively, a second type QCL RS may be configured only for one TCI state (e.g., a reference TCI state) of a plurality of TCI states and a second type QCL RS included in the one TCI state may be applied for remaining TCI state(s).

For example, one first type QCL RS and one second type QCL RS may be configured for TCI state 1. For TCI state 2, one first type QCL RS may be configured and a second type QCL RS may not be configured. In this case, UE may commonly apply a second type QCL RS of TCI state 1 (i.e., a reference TCI state) to TCI state 2, as well.

In an additional example, one first type QCL RS and one second type QCL RS may be configured for TCI state 1. One first type QCL RS and one second type QCL RS may be also configured for TCI state 2. In this case, a second type QCL RS of TCI state 1 and a second type QCL RS of TCI state 2 may be configured as the same RS.

In an additional example, one first type QCL RS and one second type QCL RS may be configured for TCI state 1. One first type QCL RS and one second type QCL RS may be also configured for TCI state 2. In this case, a second type QCL RS of TCI state 1 and a second type QCL RS of TCI state 2 may be different (or regardless of whether they are the same or different), a second type QCL RS of TCI state 1 (i.e., a reference TCI state) may be also commonly applied to TCI state 2 by disregarding a second type QCL RS of TCI state 2.

As described above, single panel UE may report to a base station as capability information that only one second type QCL RS may be configured (in a specific time unit), and a base station may configure/indicate a plurality of TCI states to corresponding UE at the same time and may configure a second type QCL RS only for one TCI state (i.e., a reference TCI state) or configure the same second type QCL RS to be applied to each of a plurality of TCI states.

In the above-described examples, a reference TCI state may be pre-defined as a TCI state with the lowest (or highest) index or may be pre-configured through separate signaling.

Embodiment 1-2

To indicate an RS in a QCL relationship with a DMRS to single panel UE, a base station may configure one TCI state to UE (e.g., through a TCI field in DCI). For example, it is assumed that a base station configures a QCL RS corresponding to TRP 1 and a QCL RS corresponding to TRP 2 to UE through one TCI state.

In this case, all of a plurality of second type QCL RSs included in one TCI state may be configured to be the same, or may be configured to be different but only one second type QCL RS (e.g., a reference second type QCL RS) thereof may be applied. Alternatively, one second type QCL RS and a plurality of first type QCL RSs may be configured for one TCI state.

For example, two first type QCL RSs and one second type QCL RS may be configured for the one TCI state.

In an additional example, two first type QCL RSs and two second type QCL RSs may be configured for the one TCI state. Here, the two second type QCL RSs may be configured as the same RS.

In an additional example, two first type QCL RSs and two second type QCL RSs may be configured for the one TCI state. Here, the two second type QCL RSs may be different (or regardless of whether they are the same or different), only one second type QCL RS (e.g., a reference second type QCL RS) thereof may be applied and remaining second type QCL RS may be disregarded.

As described above, single panel UE may report to a base station as capability information that only one second type QCL RS may be configured (in a specific time unit), and a base station may configure/indicate one TCI state to corresponding UE and may configure one second type QCL RS or configure a plurality of second type QCL RSs to be identical in the one TCI state.

In the above-described examples, a reference second type QCL RS may be pre-defined as a second type QCL RS with the lowest (or highest) (resource) index or may be pre-configured through separate signaling.

Embodiment 2

This embodiment is about a QCL RS configuration method for multiple panel UE (i.e., UE equipped with a plurality of panels, or UE which is equipped with M (here, M is an integer equal to or greater than 2) panels and that N (here, N is an integer equal to or less than M) panels being a part or all of M panels are activated).

Multiple panel UE may perform reception through a plurality of beams (or Rx beam directions) in a time unit, so a plurality of second type QCL RSs (e.g., QCL type D RSs) may be configured. In other words, as a plurality of QCL RSs corresponding to a plurality of TRPs may be configured for other types (i.e., a first type, e.g., QCL type A, B, or C) than a second type, a plurality of second type QCL RSs may be also configured.

UE may receive DMRS/PDSCH through one of a plurality of QCL type D RSs and perform channel estimation for a first channel (e.g., H_1) by using Doppler shift, Doppler spread, average delay, delay spread value, etc. computed by one of a plurality of QCL type A/B/C RSs.

In addition, UE may receive DMRS/PDSCH through another of a plurality of QCL type D RSs and perform estimation for a second channel (e.g., H_2) by using Doppler shift, Doppler spread, average delay, delay spread value, etc. computed by another of a plurality of QCL type A/B/C RSs.

Accordingly, UE may generate (or estimate) a SFN-ed channel H by computing H_1+H_2 and attempt data decoding by assuming that data is received through channel H. Alternatively, UE may assume that H_1 and H_2 are different channels and attempt data decoding by soft/hard combining data received through H_1 and data received through H_2.

As such, UE may receive DMRS/PDSCH through each of M second type QCL RSs and perform channel estimation for each of M channels (e.g., H_1, H_2, . . . , H_M) by using a channel property value computed through each of M first type QCL RSs. In addition, UE may perform data decoding by assuming data received through a channel that M channels are added up or may perform data decoding by combining data received from each of M channels.

Embodiment 2-1

To indicate an RS in a QCL relationship with a DMRS to multiple panel UE, a base station may configure a plurality of TCI states to UE (e.g., through TCI field(s) in DCI). For example, it is assumed that a base station configures TCI state 1 corresponding to TRP 1 and TCI state 2 corresponding to TRP 2 to UE.

In this case, second type QCL RSs included in a plurality of TCI states may be independently (or separately) configured and independent second type QCL RSs may be different, but a case in which they are the same is not excluded. In addition, first type QCL RSs included in a plurality of TCI states may be independently (or separately) configured and independent first type QCL RSs may be different, but a case in which they are the same is not excluded. In other words, one set (or pair) of a first type QCL RS and a second type QCL RS may be configured/indicated for each of a plurality of TCI states. A plurality of TCI states may correspond to a plurality of TRPs, respectively.

For example, one first type QCL RS and one second type QCL RS may be configured for TCI state 1. One first type QCL RS and one second type QCL RS may be also configured for TCI state 2. Here, a second type QCL RS of TCI state 1 and a second type QCL RS of TCI state 2 may be independently/separately configured. UE may generate (or estimate) H_1 by using TCI state 1 and may generate (or estimate) H_2 by using TCI state 2.

As described above, multiple panel UE may report to a base station as capability information that a plurality of second type QCL RSs may be configured (in a specific time unit) and a base station may configure/indicate a plurality of TCI states to corresponding UE at the same time and configure an independent second type QCL RS to be applied to each of a plurality of TCI states.

Embodiment 2-2

To indicate an RS in a QCL relationship with a DMRS to multiple panel UE, a base station may configure one TCI state to UE (e.g., through a TCI field in DCI). For example, it is assumed that a base station configures a QCL RS corresponding to TRP 1 and a QCL RS corresponding to TRP 2 to UE through one TCI state.

In this case, a plurality of second type QCL RSs included in one TCI state may be independently (or separately) configured and independent second type QCL RSs may be different, but a case in which they are the same is not excluded. In addition, a plurality of first type QCL RSs included in one TCI state may be independently (or separately) configured and independent first type QCL RSs may be different, but a case in which they are the same is not excluded. In other words, a plurality of sets (or pairs) each including a first type QCL RS and a second type QCL RS may be configured/indicated for each of one TCI state. A plurality of sets (or pairs) each including a first type QCL RS and a second type QCL RS may correspond to a plurality of TRPs, respectively.

For example, two first type QCL RSs and two second type QCL RSs may be configured for the one TCI state. Here, two second type QCL RSs may be independently/separately configured. UE may generate (or estimate) H_1 by using a first set (or pair) of a first type QCL RS and a second type QCL RS and may generate (or estimate) H_2 by using a second set (or pair) of a first type QCL RS and a second type QCL RS.

As described above, multiple panel UE may report to a base station as capability information that a plurality of second type QCL RSs may be configured (in a specific time unit) and a base station may configure/indicate one TCI state to corresponding UE and configure a plurality of sets (or pairs) each including a first type QCL RS and a second type QCL RS for the one TCI state.

In the above-described examples, it is described that how many second type QCL RSs may be configured for a specific RS is reported to a base station as UE capability information, but how many first type QCL RSs may be configured may be also reported to a base station as UE capability information. For example, for a PDSCH DMRS, how many QCL type A RSs may be configured for a specific RS may be reported as UE capability and a base station may configure QCL type A RSs equal to or less than that by referring to UE capability. For example, UE which reported as UE capability that up to two QCL type A RSs may be configured may perform DMRS channel estimation by using Doppler shift, Doppler spread, average delay, delay spread value, etc. from up to two QCL Type A RSs.

In the above-described examples, it is described on the assumption that 2 TRPs transmit the same data single layer by a SFN method, but the above-described examples may be also applied to a general cooperative transmission method that a plurality of TRPs/Tx-beams/Tx-panels transmit data to one UE at the same time.

In the above-described examples, it is described on the assumption that 2 TRPs transmit the same data single layer by a SFN method, but the above-described examples may be also applied when 3 or more TRPs transmit data to one UE by a SFN method or when 3 or more QCL RSs corresponding to each TRP are configured. For example, 3 or more independent first type QCL RSs and one or more common second type QCL RSs may be configured for single panel UE. In addition, 3 or more sets of independent first type QCL RSs and second type QCL RSs may be configured for multiple panel UE. In addition, part of 3 or more QCL RSs (or QCL RS sets) may be commonly configured.

In the above-described examples, it is described on the assumption that 2 TRPs transmit the same data (or PDSCH) single layer by a SFN method, but when a plurality of TRPs transmit the same DCI (or PDCCH) by a SFN method, the above-described examples may be also applied to a QCL-related configuration for DMRS channel estimation of a PDCCH.

In the above-described examples, a QCL-related configuration for PDSCH/PDCCH DMRS is mainly described, but the above-described examples may be also applied to a QCL-related configuration for other RSs (e.g., CSI-RS, TRS, SS/PBCH block) than DMRS.

For example, MTRPs may transmit the same CSI-RS by a SFN method in the same frequency and the same time resource. A plurality of first type QCL RSs (e.g., QCL Type AB/C, or a TRS or a SS/a PBCH block) may be configured to improve channel estimation performance of CSI-RS. In addition, in order to determine a receiving means (e.g., a beam/a panel) of a CSI-RS, one or a plurality of second type QCL RSs (e.g., QCL type D RS(s)) may be configured according to a report of UE capability (e.g., a single panel or multiple panels).

The above-described CSI-RS may be configured as CMR and/or IMR for a CSI report or a beam management (BM) report (i.e., for a L1-RSRP or L1-SINR report). Specifically, for a ZP/NZP IMR, as in the above-described examples, one or more QCL RSs may be configured for the same QCL type.

Specifically, a plurality of first type QCL RSs and/or one (e.g., for a single panel) or a plurality of (e.g., multiple panels) second type QCL RSs used for a ZP/NZP IMR may be configured.

In addition, when a second type QCL assumption for an IMR follows a second type QCL assumption of a CMR associated with a corresponding IMR (e.g., when there is one QCL type D RS for a CMR, there is also one QCL type D RS for an IMR, and when there are a plurality of QCL type D RSs for a CMR, there are also a plurality of QCL type D RSs for an IMR), it is not required to separately configure a second type QCL RS for an IMR and only a plurality of first type QCL RSs for an IMR may be configured.

In case where MTRPs transmit a CMR by a SFN method and transmit an IMR not by a SFN method, a terminal may estimate a signal/a channel through a plurality of beams (i.e., Rx beams of a plurality of second type QCL RSs) according to a SFN CMR. In this case, interference and noise (interference+noise) may be received only through one beam of a plurality of beams and a Rx beam for an IMR may be determined based on a specific RS among a plurality of second type QCL RSs of a CMR. The specific RS may correspond to a reference second type QCL RS and a reference second type QCL RS may be pre-configured from a base station to UE or may be determined according to a predetermined rule (e.g., the lowest index or the highest index, or a first QCL type D RS or a last QCL type D RS).

In an additional example, MTRPs may transmit the same TRS by a SFN method in the same frequency and the same time resource. A plurality of first type QCL RSs (e.g., a QCL Type C RS, or a SS/PBCH block) may be configured to improve frequency/time tracking performance of the TRS. In addition, in order to determine a receiving means (e.g., a beam/a panel) of a TRS, one or a plurality of second type QCL RSs (e.g., a QCL type D RS) may be configured according to a report of UE capability (e.g., a single panel or multiple panels).

For example, each of MTRPs transmit a different SS/PBCH block, but when MTRPs transmit a CSI-RS, a TRS, a DMRS, etc. by a SFN method, the above-described examples may be applied to a QCL related configuration of a TRS. Specifically, one (e.g., for a single panel) or a plurality of (e.g., for multiple panels) second type QCL RSs for a TRS may be configured according to UE capability and a plurality of first type QCL RSs (e.g., a QCL type C RS) for a TRS may be configured.

For a CSI-RS or a DMRS, a TRS transmitted by a SFN method or a CSI-RS transmitted by a SFN method may be configured as a QCL RS.

In the above-described examples, it is described by assuming a first type QCL RS and a second type QCL RS, but when a new third type QCL RS is supported, for a QCL RS related to a channel property may be configured by multiple numbers, and a QCL RS related to a spatial parameter may be commonly configured to single panel UE and may be configured by multiple numbers to multiple panel UE.

Figure 18:
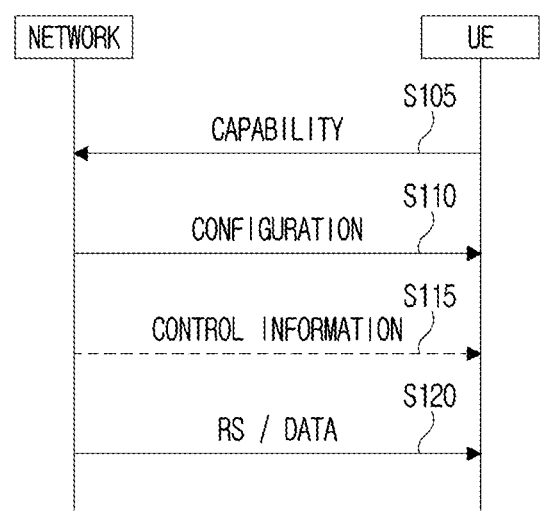
FIG. 18 is a diagram for describing a signaling process according to an embodiment of the present disclosure.

FIG. 18 is a diagram for describing a signaling procedure according to an embodiment of the present disclosure.

FIG. 18 represents an example of signaling between a network side and UE to which the above-described embodiments may be applied. Here, UE/Network side may be an example and may be applied by being substituted with a variety of devices as described in FIG. 19. FIG. 18 is only for convenience of description, but it is not intended to limit a scope of the present disclosure. In addition, some step(s) shown in FIG. 18 may be omitted according to a situation and/or a configuration, etc. In addition, the above-described MIMO related RS and/or M-TRP related operation, etc. may be referred to/used for an operation of a Network side/UE in FIG. 18.

In the following description, a Network side may be one base station including a plurality of TRPs or may be one cell including a plurality of TRPs. In an example, ideal/non-ideal backhaul may be configured between TRP 1 and TRP 2 included in a Network side. In addition, the following description is described based on a plurality of TRPs, but it may be also equivalently extended and applied to transmission through a plurality of panels/cells.

UE may transmit capability to a Network side (S105). The capability may include information related to a transmission and reception capability of UE (e.g., information on supported band/information on number of Rx beams/information on number of panels/information on spatial relation information supportable by UE, etc.). For example, as in the above-described embodiments, the capability may include information on number of QCL RSs with which UE may be configured (e.g., first type/second type QCL RSs).

For example, the above-described operation in S105 that UE (100/200 in FIG. 19) transmits the capability to a Network side (200/100 in FIG. 19) may be implemented by a device in FIG. 19 which will be described below. For example, in reference to FIG. 19, one or more processors 102 may control one or more transceivers 106 and/or one or more memories 104, etc. to transmit the capability and one or more transceivers 106 may transmit the capability to a Network side.

UE may receive a configuration from a Network side (S110). The configuration may include one or more of system information (SI), scheduling information, or Beam management (BM) related configuration information (e.g., DL BM related CSI-ResourceConfig IE/NZP CSI-RS resource set IE, etc.). For example, the configuration may include information related to a configuration of a network side (e.g., a TRP configuration), resource information related to multiple TRPs based transmission and reception (e.g., resource allocation), etc. The configuration may be transmitted through a higher layer (e.g., RRC or MAC CE). In addition, when the configuration information is predefined or preconfigured, a corresponding step may be omitted.

For example, as in the above-described embodiments, the configuration may include information on one or more of TCI state(s), QCL RS(s), or DMRS port(s). For example, a plurality of TCI states may be configured for DMRS port(s) related to a DL channel (e.g., PDCCH/PDSCH) based on the configuration. For example, the corresponding number of QCL RSs (e.g., second type QCL RSs) may be configured based on the capability. For example, a second type QCL RS included in the TCI state may be configured based on the number of (activated) receiving means of UE. For example, one or more common TCI states may be indicated/configured for single panel UE and a second type QCL RS included in each TCI state may be the same, or a second type QCL RS may be configured/indicated only for one of a plurality of TCI states and a second type QCL RS may not be configured/indicated for remaining TCI state. For example, one or more TCI states may be indicated/configured for multiple panel UE and a combination/a set of a first type QCL RS and a second type QCL RS may be included in each TCI state. In other words, a plurality of second type QCL RSs may be configured/indicated.

For example, the above-described operation in S110 that UE (100/200 in FIG. 19) receives the configuration from a Network side (200/100 in FIG. 19) may be implemented by a device in FIG. 19 which will be described below. For example, in reference to FIG. 19, one or more processors 102 may control one or more transceivers 106 and/or one or more memories 104, etc. to receive the configuration and one or more transceivers 106 may receive the configuration from a Network side.

UE may receive control information from a network side S115. The control information may be received through a control channel (e.g., PDCCH). In an example, the control information may be DCI. For single DCI based cooperative transmission, the control information may be transmitted through/using a representative TRP of TRPs included in a network side and for multiple DCI based cooperative transmission, the control information may be transmitted through/using each TRP included in a network side. For example, based on the above-described embodiments, the control information may include information on one or more of TCI state(s), QCL RS(s), or DMRS port(s).

For example, one or more TCI states may be indicated/configured in a TCI state field(s) in the control information (e.g., DCI). Each TCI state may include a plurality of QCL RS information. For example, the corresponding number of QCL RSs (e.g., second type QCL RSs) may be configured based on the capability. For example, a second type QCL RS included in the TCI state may be configured based on the number of panels of UE. For example, one or more TCI states may be indicated/configured for single panel UE and a second type QCL RS included in each TCI state may be the same, or a second type QCL RS may be configured/indicated only for one of a plurality of TCI states and a second type QCL RS may not be configured/indicated for remaining TCI state. For example, one or more TCI states may be indicated/configured for multiple panel UE and a combination/a set of a first type QCL RS and a second type QCL RS may be included in each TCI state. In other words, a plurality of second type QCL RSs may be configured/indicated.

For example, the above-described operation in S115 that UE (100/200 in FIG. 19) receives the control information from a network side (200/100 in FIG. 19) may be implemented by a device in FIG. 19 which will be described after. For example, in reference to FIG. 19, one or more processors 102 may control one or more transceivers 106 and/or one or more memories 104, etc. to receive the control information and one or more transceivers 106 may receive the control information from a network side.

UE may receive a RS/data from a Network side (S120). The RS/Data may be received through a DL channel (e.g., PDCCH/PDSCH). For example, the RS may be a DMRS/CSI-RS/TRS and the above-described MIMO related RS and CSI related operation, etc. may be referred to. For example, the RS/Data, as described in the above-described embodiments, may be transmitted/received by a SFN transmission method. For example, the RS/Data may be received based on information configured/indicated in S110/S115. For example, UE may perform channel estimation/compensation and receive the RS/Data based on information configured/indicated in S110/S115. For example, based on the above-described embodiments, UE may perform channel estimation/compensation based on a QCL RS corresponding to a TCI state. For example, as in the above-described embodiment 2, channel information on each TRP may be added up based on QCL information included in a TCI state corresponding to each TRP or channel estimation/decoding may be performed through soft/hard combining.

For example, an operation that UE (100/200 in FIG. 19) in the above-described S120 receives the RS/Data from a network side (200/100 in FIG. 19) may be implemented by a device in FIG. 19 which will be described below. For example, in reference to FIG. 19, one or more processors 102 may control one or more transceivers 106 and/or one or more memories 104, etc. to receive the RS/Data and one or more transceivers 106 may receive the RS/Data from a network side.

As mentioned above, the above-described network side/UE signaling and operation (e.g., embodiment 1, embodiment 2, FIG. 15A to FIG. 18, etc.) may be implemented by a device (e.g., a device in FIG. 19) which will be described below. For example, a network side (e.g., TRP 1 and/or TRP 2) may correspond to a first wireless device and UE may correspond to a second wireless device and in some cases, the opposite may be considered.

For example, the above-described network side/UE signaling and operation (e.g., embodiment 1, embodiment 2, FIG. 15A to FIG. 18, etc.) may be processed by one or more processors in FIG. 19 (e.g., 102, 202) and the above-described network side/UE signaling and operation (e.g., embodiment 1, embodiment 2, FIG. 15A to FIG. 18, etc.) may be stored in a memory (e.g., one or more memories in FIG. 19 (e.g., 104, 204)) in a form of a command/program (e.g., an instruction, an executable code) for driving one or more processors in FIG. 19 (e.g., 102, 202).

General Device to which the Present Disclosure May be Applied

FIG. 19 is a diagram which illustrates a block diagram of a wireless communication system according to an embodiment of the present disclosure.

In reference to FIG. 19, a first device/wireless device 100 and a second device/wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts included in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts included in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts included in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts included in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts included in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts included in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts included in the present disclosure may be implemented by using a firmware or a software and a firmware or a software may be implemented to include a module, a procedure, a function, etc. A firmware or a software configured to perform description, functions, procedures, proposals, methods and/or operation flow charts included in the present disclosure may be included in one or more processors 102, 202 or may be stored in one or more memories 104, 204 and driven by one or more processors 102, 202. Description, functions, procedures, proposals, methods and/or operation flow charts included in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. included in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. included in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat S1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

What is claimed is:

1. A method of receiving a downlink signal by a terminal in a wireless communication system, the method comprising:
    transmitting, to a base station, capability information of the terminal, wherein the capability information includes information related to a number of second type quasi-colocation reference signal (QCL RS) supported by the terminal based on a number of activated receiving means of the terminal;
    receiving, from the base station, configuration information for a plurality of first type QCL RSs and at least one second type QCL RS; and
    receiving the downlink signal based on the configuration information,
    wherein, based on the number of second type QCL RS being 1, the downlink signal is received based on one specific second type QCL RS among the at least one second type QCL RS.

2. The method of claim 1, wherein:
    based on the number of activated receiving means being 1, the number of second type QCL RS is 1.

3. The method of claim 2, wherein:
    the configuration information includes a plurality of transmission configuration indicator (TCI) states,
    each of the plurality of TCI states is configured with one first type QCL RS,
    only one TCI state among the plurality of TCI states is configured with one second type QCL RS, and
    the one second type QCL RS configured for the one TCI state is the one specific second type QCL RS.

4. The method of claim 2, wherein:
    the configuration information includes a plurality of transmission configuration indicator (TCI) states,
    each of the plurality of TCI states is configured with one set of the first type QCL RS and the second type QCL RS,
    a plurality of second type QCL RSs configured for different TCI states are an identical RS, and
    the identical RS is the one specific second type QCL RS.

5. The method of claim 2, wherein:
    the configuration information includes a plurality of transmission configuration indicator (TCI) states,
    each of the plurality of TCI states is configured with one set of the first type QCL RS and the second type QCL RS, and
    based on a plurality of second type QCL RSs configured for different TCI states being independent RSs, one second type QCL RS configured for a reference TCI state among the plurality of TCI states is the one specific second type QCL RS.

6. The method of claim 2, wherein:
    the configuration information includes one transmission configuration indicator (TCI) state,
    the one TCI state is configured with a plurality of first type QCL RSs and one second type QCL RS, and
    the one second type QCL RS configured for the one TCI state is the one specific second type QCL RS.

7. The method of claim 2, wherein:
    the configuration information includes one transmission configuration indicator (TCI) state,
    the one TCI state is configured with a plurality of sets of the first type QCL RS and the second type QCL RS, a plurality of second type QCL RSs of different sets are an identical RS, and the identical RS is the one specific second type QCL RS.

8. The method of claim 2, wherein:

the configuration information includes one transmission configuration indicator (TCI) state, the one TCI state is configured with a plurality of sets of the first type QCL RS and the second type QCL RS, based on a plurality of second type QCL RSs of different sets being independent RSs, a reference second type QCL RS among the plurality of second type QCL RSs is the one specific second type QCL RS.

9. The method of claim 1, wherein:

based on the number of second type QCL RS being more than or equal to 2, the downlink signal is received based on a plurality of second type QCL RSs.

10. The method of claim 9, wherein:

based on the number of activated receiving means being more than or equal to 2, the number of second type QCL RS is more than or equal to 2.

11. The method of claim 10, wherein:

the configuration information includes a plurality of transmission configuration indicator (TCI) states, and each of the plurality of TCI states is configured with one set of the first type QCL RS and the second type QCL RS.

12. The method of claim 10, wherein:

the configuration information includes one transmission configuration indicator (TCI) state, and the one TCI state is configured with a plurality of sets of the first type QCL RS and the second type QCL RS.

13. The method of claim 1, wherein:

the receiving means includes at least one of antenna array, panel, or beam.

14. The method of claim 1, wherein:

the number of activated receiving means is a number of receiving means activated in a specific time unit among at least one receiving means equipped with the terminal.

15. The method of claim 1, wherein:

the configuration information includes at least one of:

information, signaled through a higher layer, for TCI state candidates including candidates of the first type QCL RS and the second type QCL RS, or information, indicated through downlink control information, for at least one TCI state among the TCI state candidates.

16. The method of claim 1, wherein:

the configuration information is configured based on the capability information of the terminal.

17. The method of claim 1, wherein:

the downlink signal includes at least one of demodulation reference signal (DMRS) related to physical downlink shared channel (PDSCH), DMRS related to physical downlink control channel (PDCCH), channel state information-reference signal (CSI-RS), tracking reference signal (TRS), or synchronization signal/physical broadcast channel (SS/PBCH) block.

18. A terminal for receiving a downlink signal in a wireless communication system, the terminal comprising:

at least one transceiver; and at least one processor connected to the at least one transceiver, wherein the processor is configured to:

transmit, through the at least one transceiver to a base station, capability information of the terminal, wherein the capability information includes information related to a number of second type quasi-colocation reference signal (QCL RS) supported by the terminal based on a number of activated receiving means of the terminal;

receive, through the at least one transceiver from the base station, configuration information for a plurality of first type QCL RSs and at least one second type QCL RS; and receive, through the at least one transceiver, the downlink signal based on the configuration information, wherein, based on the number of second type QCL RS being 1, the downlink signal is received based on one specific second type QCL RS among the at least one second type QCL RS.

19. A method of transmitting a downlink signal by a base station in a wireless communication system, the method comprising:

receiving, from a terminal, capability information of the terminal, wherein the capability information includes information related to a number of second type quasi-colocation reference signal (QCL RS) supported by the terminal based on a number of activated receiving means of the terminal;

transmitting, to the terminal, configuration information for a plurality of first type QCL RSs and at least one second type QCL RS; and transmitting the downlink signal based on the configuration information, wherein, based on the number of second type QCL RS being 1, the downlink signal is received based on one specific second type QCL RS among the at least one second type QCL RS.

* * * * *